US012777341B2

(12) United States Patent
He et al.

(10) Patent No.: US 12,777,341 B2
(45) Date of Patent: Oct. 27, 2026

(54) METHOD AND APPARATUS FOR BEAMFORMING FEEDBACK REDUCTION IN WIRELESS LOCAL AREA NETWORKS

(71) Applicant: SAMSUNG ELECTRONICS CO., LTD., Suwon-si (KR)

(72) Inventors: Ziming He, Cambridge (GB); Fei Tong, Cambridge (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 473 days.

(21) Appl. No.: 18/370,656

(22) Filed: Sep. 20, 2023

(65) Prior Publication Data

US 2024/0306005 A1 Sep. 12, 2024

(30) Foreign Application Priority Data

Mar. 6, 2023 (KR) ........................ 10-2023-0029278

(51) Int. Cl.
*H04W 16/28* (2009.01)
*H04B 7/06* (2006.01)
*H04W 84/12* (2009.01)

(52) U.S. Cl.
CPC .......... *H04W 16/28* (2013.01); *H04B 7/0617* (2013.01); *H04W 84/12* (2013.01)

(58) Field of Classification Search
CPC .... H04W 16/28; H04W 84/12; H04B 7/0617; H04B 7/0456; H04B 7/0626; H04B 7/0695; H04B 7/0658; H04L 25/0218

(Continued)

(56) References Cited

U.S. PATENT DOCUMENTS

2019/0373583 A1 12/2019 Chu et al.
2020/0091970 A1* 3/2020 Lee ...................... H04B 7/0634
2020/0112353 A1* 4/2020 Liu ...................... H04B 7/0632
2020/0304194 A1* 9/2020 Jeon ..................... H04B 7/0617

(Continued)

FOREIGN PATENT DOCUMENTS

JP 2023-028336 A 3/2023
KR 10-2023-0007966 A 1/2023

OTHER PUBLICATIONS

Communication issued on Jul. 18, 2024 by the European Patent Office for European Patent Application No. 24160255.6.

(Continued)

*Primary Examiner* — Obaidul Huq
(74) *Attorney, Agent, or Firm* — Sughrue Mion, PLLC

(57) ABSTRACT

A second apparatus configured to communicate with a first apparatus in a wireless local area network (WLAN), including: a transceiver; and at least one processor configured to: receive, using the transceiver, a null data packet (NDP) from the first apparatus, generate a channel estimate based on the NDP, decompose the channel estimate to obtain a feedback matrix, based on the feedback matrix, obtain beamforming information to be used by the first apparatus to perform beamforming, transmit, using the transceiver, the beamforming information to the first apparatus, and receive, using the transceiver, a data transmission which is beamformed by the first apparatus based on the beamforming information, wherein the beamforming information includes at least one from among: a pair of angle indices which indicate a pair of angle vectors to be used by the first apparatus to beamform the data transmission, and a steering matrix index which indicates a steering matrix to be used by the first apparatus to beamform the data transmission.

24 Claims, 22 Drawing Sheets

(58) Field of Classification Search
USPC .......................................... 370/310, 328, 329
See application file for complete search history.

(56) References Cited

U.S. PATENT DOCUMENTS

| | | | | |
|---|---|---|---|---|
| 2020/0358512 | A1* | 11/2020 | Zhan .................... | H04B 7/0482 |
| 2022/0190896 | A1 | 6/2022 | Jeon | |
| 2022/0200678 | A1 | 6/2022 | Ciochina et al. | |
| 2023/0009991 | A1 | 1/2023 | Liu et al. | |
| 2023/0032241 | A1 | 2/2023 | Mo et al. | |

OTHER PUBLICATIONS

Wonjun Kim et al., "Towards deep learning-aided wireless channel estimation and channel state information feedback for 6G," Journal of Communications and Networks (vol. 25, Issue: 1, Feb. 2023) (Total 16 pages).

Sohei Itahara et al., "Beamforming Feedback-Based Model-Driven Angle of Departure Estimation Toward Legacy Support in WiFi Sensing: An Experimental Study," IEEE Access, vol. 10, 2022, pp. 59737-59747.

"IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 1: Enhancements for High-Efficiency Wlan," IEEE Std 802.11ax-2021 (Amendment to IEEE Std 802.11-2020), May 19, 2021, (Total pp. 768).

Mrugen Deshmukh et al., "Intelligent Feedback Overhead Reduction (iFOR) in Wi-Fi 7 and Beyond," 2022 IEEE 95th Vehicular Technology Conference, Mar. 9, 2022 (Total 6 pages).

* cited by examiner

METHOD AND APPARATUS FOR BEAMFORMING FEEDBACK REDUCTION IN WIRELESS LOCAL AREA NETWORKS

CROSS-REFERENCE TO RELATED APPLICATION

This application is based on and claims priority under 35 U.S.C. § 119 to Korean Patent Application No. 10-2023-0029278, filed on Mar. 6, 2023, in the Korean Intellectual Property Office, the disclosure of which is incorporated by reference herein in its entirety.

BACKGROUND

1. Field

The present disclosure relates to wireless communication, and more particularly, to an apparatus and method for performing beamforming.

2. Description of Related Art

As an example of wireless communication, a wireless local area network (WLAN) may be used to connect two or more apparatuses to each other using a wireless signal transmission method, and WLAN technology may be based on the institute of electrical and electronics engineers (IEEE) 802.11 standard. The 802.11 standard has evolved into 802.11b, 802.11a, 802.11g, 802.11n, 802.1 lac, and 802.11ax standards, and may support a transmission rate of up to 1 Gbyte/s based on orthogonal frequency-division multiplexing (OFDM) technology.

According to the 802.11ac standard, data may be simultaneously transmitted to a plurality of users using a multi-user multi-input multi-output (MU-MIMO) method. In the 802.11ax standard, referred to as high efficiency (HE), access to multiple users is implemented by dividing and providing users with available subcarriers by applying an orthogonal frequency-division multiple access (OFDMA) technology as well as MU-MIMO. As such, a WLAN system based on the 802.1 lax standard may effectively support communication in a dense area and an outdoor area.

In the 802.11b standard, referred to as extremely high throughput (EHT), support for 6 GHz unlicensed frequency band, utilization of bandwidth of maximum 320 MHz for each channel, introduction of hybrid automatic repeat and request (HARQ), support of maximum 16×16 MIMO, etc. are to be implemented. As such, a next generation WLAN system may effectively support low latency and ultra high-speed transmission such as new radio (NR) that is a 5G technique.

However, next generation WLAN systems may require a large amount of signaling and a large amount of resources to perform beamforming. Accordingly, there is a need to reduce signaling and resources required to perform beamforming.

SUMMARY

Provided are apparatuses and methods for performing beamforming in a wireless communication system.

Additional aspects will be set forth in part in the description which follows and, in part, will be apparent from the description, or may be learned by practice of the presented embodiments.

In accordance with an aspect of the disclosure, a second apparatus configured to communicate with a first apparatus in a wireless local area network (WLAN) includes a transceiver; and at least one processor configured to: receive, using the transceiver, a null data packet (NDP) from the first apparatus, generate a channel estimate based on the NDP, decompose the channel estimate to obtain a feedback matrix, based on the feedback matrix, obtain beamforming information to be used by the first apparatus to perform beamforming, transmit, using the transceiver, the beamforming information to the first apparatus, and receive, using the transceiver, a data transmission which is beamformed by the first apparatus based on the beamforming information, wherein the beamforming information includes at least one from among: a pair of angle indices which indicate a pair of angle vectors to be used by the first apparatus to beamform the data transmission, and a steering matrix index which indicates a steering matrix to be used by the first apparatus to beamform the data transmission.

In accordance with an aspect of the disclosure, a first apparatus configured to communicate with a second apparatus in a wireless local area network (WLAN), includes a transceiver; and at least one processor configured to: transmit, using the transceiver, a null data packet (NDP) to the second apparatus, receive, using the transceiver, beamforming information from the second apparatus, and transmit, using the transceiver, a data transmission which is beamformed based on the beamforming information to the second apparatus, wherein the beamforming information includes at least one from among: a pair of angle indices which indicate a pair of angles used to beamform the data transmission, and a steering matrix index which indicates a steering matrix used to beamform the data transmission.

In accordance with an aspect of the disclosure, a method of controlling a second apparatus configured to communicate with a first apparatus in a wireless local area network (WLAN), includes receiving, using a transceiver of the second apparatus, a null data packet (NDP) from the first apparatus; generating a channel estimate based on the NDP; decomposing the channel estimate to obtain a feedback matrix; based on the feedback matrix, obtaining beamforming information to be used by the first apparatus to perform beamforming; transmitting, using the transceiver, the beamforming information to the first apparatus; and receiving, using the transceiver, a data transmission which is beamformed by the first apparatus based on the beamforming information, wherein the beamforming information includes at least one from among: a pair of angle indices which indicate a pair of angle vectors to be used by the first apparatus to beamform the data transmission, and a steering matrix index which indicates a steering matrix to be used by the first apparatus to beamform the data transmission.

In accordance with an aspect of the disclosure, a method of controlling a first apparatus configured to communicate with a second apparatus in a wireless local area network (WLAN), includes transmitting, using a transceiver of the first apparatus, a null data packet (NDP) to the second apparatus; receiving, using the transceiver, beamforming information from the second apparatus; and transmitting, using the transceiver, a data transmission which is beamformed based on the beamforming information to the second apparatus, wherein the beamforming information comprises at least one from among a pair of angle indices which indicate a pair of angles used to beamform the data transmission, and a steering matrix index which indicates a steering matrix used to beamform the data transmission.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
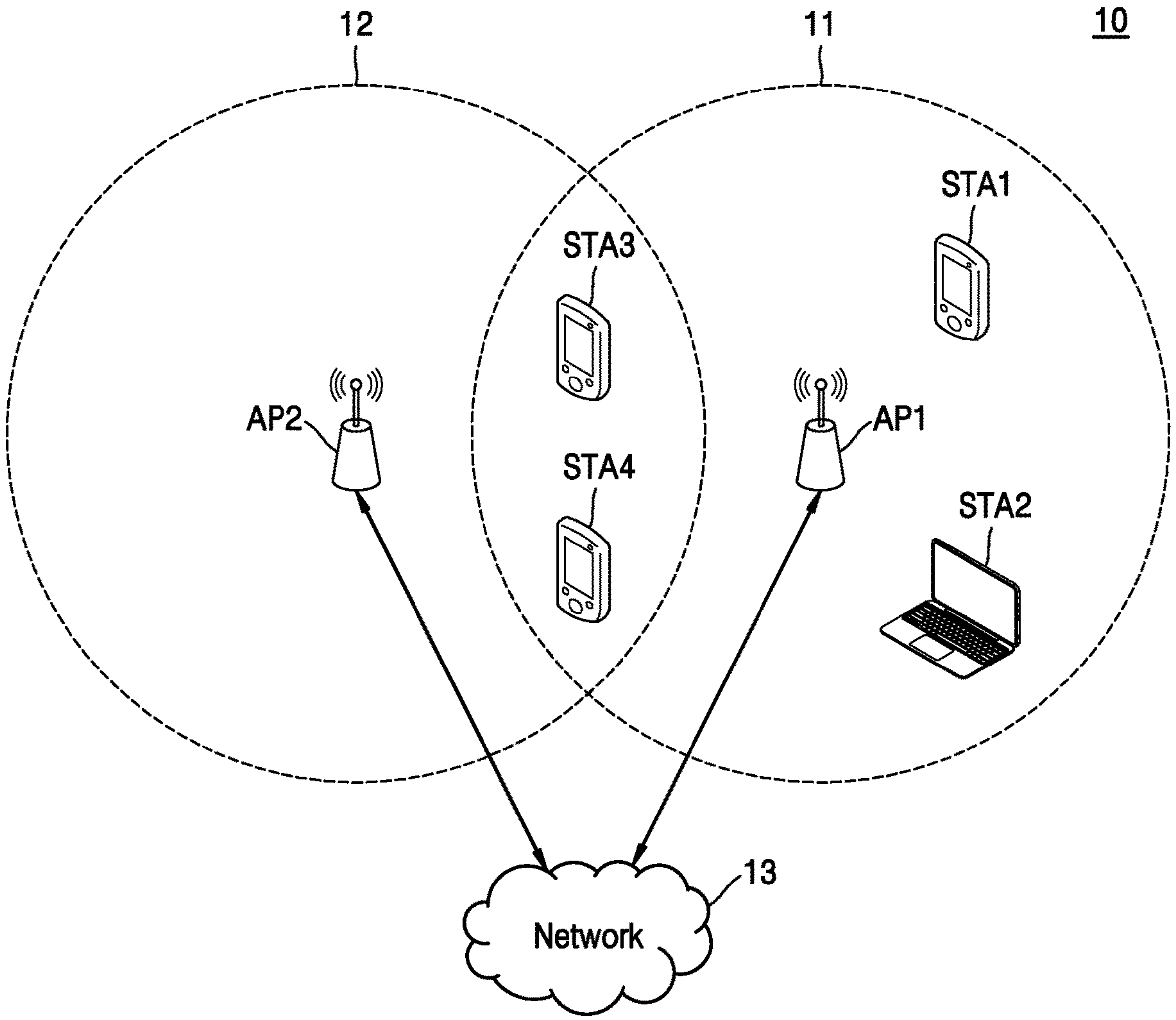
FIG. 1 is a diagram illustrating a wireless communication system according to embodiments.

Advantages and features of embodiments of the disclosure, and methods of achieving them, will be more apparent with reference to the description below in conjunction with the accompanying drawings. However, embodiments are not limited thereto. In addition, specific configurations described only in a particular embodiment may be used in other embodiments. Throughout the description below, the same reference numerals may generally refer to the same elements.

The terminology used herein is for the purpose of describing example embodiments and is not intended to limit the scope of the disclosure. In this specification, the singular also includes the plural, unless specifically stated otherwise in the phrase. As used herein, "comprises" and/or "comprising" may mean that a recited element, step, operation, and/or apparatus does not exclude the presence or addition of one or more other elements, steps, operations, and/or apparatuses.

Unless otherwise defined, all terms (including technical and scientific terms) used herein may be used with the meaning commonly understood by those of ordinary skill in the art to which this disclosure belongs. In addition, terms defined in a commonly used dictionary are not to be interpreted ideally or excessively unless clearly defined in particular.

In addition, in describing the example embodiments, although OFDM or OFDMA-based wireless communication systems, in particular, IEEE 802.11 standards, are mainly described, embodiments may be applicable to other communication systems having a similar technical background and channel form with slight modifications within the scope not significantly departing from the scope of the present disclosure, which is possible at the discretion of a person skilled in the art of the present disclosure, wherein the communication systems having a similar technical background and channel form include, for example, a cellular communication system such as long term evolution (LTE), LTE-advanced (LTE-A), new radio (NR), wireless broadband (WiBro), global system for mobile communication (GSM) or a short-range communication system such as Bluetooth or near field communication (NFC).

In addition, before proceeding with the detailed description that follows, definitions of certain words and phrases used herein are set forth. The terms "comprise" and "include" and derivatives of the terms "comprise" and "include" denote inclusive without limitation. The word "connects" and derivatives of the word "connect" refer to any direct or indirect communication between two or more components, whether or not the two or more components are in physical contact with each other. The terms "transmit", "receive", and "communicate", and derivatives of the terms "transmit", "receive", and "communicate" include both direct and indirect communication. The word "or" is an inclusive word meaning 'and/or'. The word "related to" and derivatives of "related to" denote to include, to be included in, to interconnect with, to imply, to be implied in, to connect with, to combine with, to communicate with, to cooperate with, to intervene, to place alongside, to approximate, to be bound by, to have, to have the characteristics of, to relate to, and the like. The term "controller" denotes any apparatus, system, or part thereof that controls at least one operation. Such a controller may be implemented in hardware or a combination of hardware and software and/or firmware. Functions associated with any particular controller may be centralized or distributed, either locally or remotely. The phrase "at least one", when used with a list of items, denotes that different combinations of one or more of the listed items may be used, and that only one item in the list may be required. For example, "at least one of A, B, and C" includes any one of combinations of A, B, C, A and B, A and C, B and C, and A, B and C.

In addition, various functions described below may be implemented or supported by artificial intelligence technology or one or more computer programs, and each of the programs may include computer-readable program code and may be embodied in a computer-readable medium. The terms "application" and "program" refer to one or more computer programs, software components, sets of instructions, procedures, functions, objects, classes, instances, related data, or portions thereof suitable for implementation of suitable computer-readable program code. The term "computer-readable program code" includes computer code of any type, including source code, object code, and executable code. The term "computer-readable medium" includes any type of medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. Non-transitory computer-readable media includes media in which data may be permanently stored, and media in which data is stored and may be overwritten later, such as a rewritable optical disc or a removable memory apparatus.

In various example embodiments described below, a hardware approach is described as an example. However, because various example embodiments include technology using both hardware and software, the various example embodiments do not exclude a software-based approach.

In addition, terms referring to control information, terms referring to entries, terms referring to network entities, terms referring to messages, and terms referring to a component of an apparatus, used in the description to be described below, are examples for convenience of description. Accordingly, the example embodiments are not limited to the terms described below, and other terms having equivalent technical meanings may be used.

FIG. 1 is a diagram illustrating a wireless communication system 10 according to embodiments. In detail, FIG. 1 shows a wireless local area network (WLAN) system as an example of the wireless communication system 10.

Referring to FIG. 1, the wireless communication system 10 may include a first access point AP1 and a second access point AP2, a first station STA1, a second station STA2, a third station STA3, and a fourth station STA4. The first and second access points AP1 and AP2 may connect to a network 13, which may include for example the Internet, an internet protocol (IP) network, or any other network. The first access point AP1 may provide the first station STA1, the second station STA2, the third station STA3, and the fourth station STA4 with access to the network 13 within a first coverage area 11, and the second access point AP2 may also provide the third and fourth stations STA3 and STA4 with access to the network 13 within a second coverage area 12. In embodiments, the first and second access points AP1 and AP2 may communicate with at least one of the first station STA1, the second station STA2, the third station STA3, and the fourth station STA4, based on wireless fidelity (WiFi) or any other WLAN access technology.

In embodiments, an access point may be referred to as a router, a gateway, and the like, and a station may be referred to as a mobile station, a subscriber station, a terminal, a mobile terminal, a wireless terminal, user equipment, a user, and the like. In embodiments, a station may be a portable apparatus, such as a mobile phone, a laptop computer, a wearable apparatus, or the like, or a stationary apparatus, such as a desktop computer, a smart television, or the like. In embodiments, an access point may be referred to as a first apparatus, and a station may be referred to as a second to a fourth apparatus.

In embodiments, an access point may allocate at least one resource unit (RU) to at least one station. The access point may transmit data through the allocated at least one RU, and the at least one station may receive data through the allocated at least one RU. In 802.1 lax (hereafter high efficiency (HE)), an access point may allocate only a single RU to at least one station, while in 802.11be (hereafter EHT) or next-generation IEEE 802.11 standards (hereafter EHT+), an access point may allocate a multi-resource unit (MRU) including two or more RUs to at least one station. For example, the first access point AP1 may allocate a MRU to at least one of the first station STA1, the second station STA2, the third station STA3, and the fourth station STA4, and may transmit data through the allocated MRU. That is, for example, a first station STA1 may have allocated to the first station STA1 by the first access point AP1 a MRU including two or more RUs, and the second station STA2 may have allocated to the second station STA2 by the first access point AP1 a MRU including two or more RUs, and so on.

In embodiments, an access point may communicate with the at least one station based on beamforming. For example, single-user beamforming may improve reception performance of a single user, and multi-user beamforming may improve reception performance of multiple users by removing interference between the multiple users. In embodiments, an access point may transmit an aggregated physical layer protocol data unit (PPDU) including a null data packet (NDP).

Figure 2:
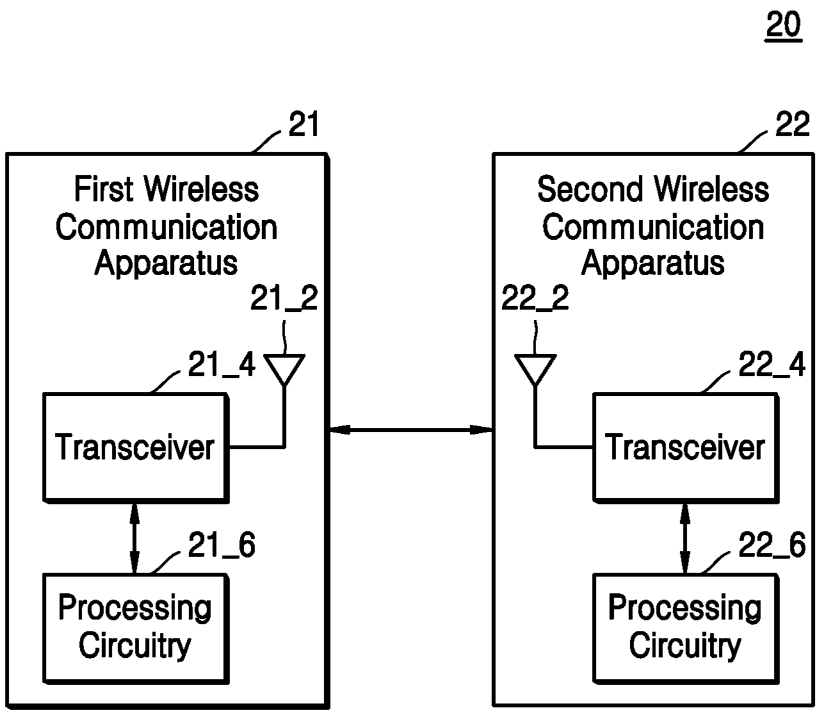
FIG. 2 is a block diagram illustrating a wireless communication system according to embodiments.

FIG. 2 is a block diagram illustrating a wireless communication system 20 according to an example embodiment. In detail, the block diagram of FIG. 2 shows a first wireless communication apparatus 21 and a second wireless communication apparatus 22 that communicate with each other in the wireless communication system 20. Each of the first wireless communication apparatus 21 and the second wireless communication apparatus 22 of FIG. 2 may be any apparatus communicating in the wireless communication system 20 and may be referred to as an apparatus for wireless communication. In some example embodiments, each of the first wireless communication apparatus 21 and the second wireless communication apparatus 22 may be an access point or station of a WLAN system. For example, each of the first wireless communication apparatus 21 and the second wireless communication apparatus 22 may correspond to at least one of the first access point AP1, the second access point AP2, the first station STA1, the second station STA2, the third station STA3, and the fourth station STA4 described above.

Referring to FIG. 2, the first wireless communication apparatus 21 may include an antenna 21_2, a transceiver 21_4, and processing circuitry 216. In some example embodiments, the antenna 212, the transceiver 21_4, and the processing circuitry 21_6 may be included in one package or may be included in different packages, respectively. The second wireless communication apparatus 22 may also include an antenna 222, a transceiver 22_4, and processing circuitry 226. Hereinafter, descriptions already given of the first wireless communication apparatus 21 and the second wireless communication apparatus 22 are omitted.

The antenna 21_2 may receive a signal from the second wireless communication apparatus 22 and provide the received signal to the transceiver 21_4, and may transmit the signal provided from the transceiver 21_4 to the second wireless communication apparatus 22. In some example embodiments, the antenna 21_2 may include a plurality of antennas for multiple input multiple output (MIMO). In addition, in some example embodiments, the antenna 21_2 may include a phased array for beamforming.

The transceiver 21_4 may process a signal received from the second wireless communication apparatus 22 through the antenna 21_2, and may provide the processed signal to the processing circuitry 216. In addition, the transceiver 214 may process the signal provided from the processing circuitry 21_6 and output the processed signal through the antenna 21_2. In some example embodiments, the transceiver 21_4 may include one or more analog circuits such as a low noise amplifier, a mixer, a filter, a power amplifier, an oscillator, and the like. In some example embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication apparatus 22 by processing the signal received from the transceiver 21_4. For example, the processing circuitry 21_6 may extract information by demodulating and/or decoding a signal received from the transceiver 21_4. In addition, the processing circuitry 21_6 may generate a signal including information to be transmitted to the second wireless communication apparatus 22 and provide the signal to the transceiver 21_4. For example, the processing circuitry 21_6 may provide a signal generated by encoding and/or modulating data to be transmitted to the second wireless communication apparatus 22 to the transceiver 21_4. In some example embodiments, the processing circuitry 21_6 may include a programmable component such as a central processing unit (CPU), a digital signal processor (DSP), and the like, may include reconfigurable components, such as field programmable gate arrays (FPGAs), and may include a component that provides a fixed function, such as an intellectual property (IP) core. In embodiments, the processing circuitry 21_6 may include or access memory that stores data and/or a series of instructions. In embodiments, operations performed by the transceiver 21_4 and/or the processing circuitry 21_6 may simply be referred to as operations performed by the first wireless communication apparatus 21. Accordingly, operations described as being performed by an access point may be performed by a transceiver and/or processing circuitry included in the access point, and operations described as being performed by a station may be performed by transceivers and/or processing circuitry included in the station.

Figure 3:
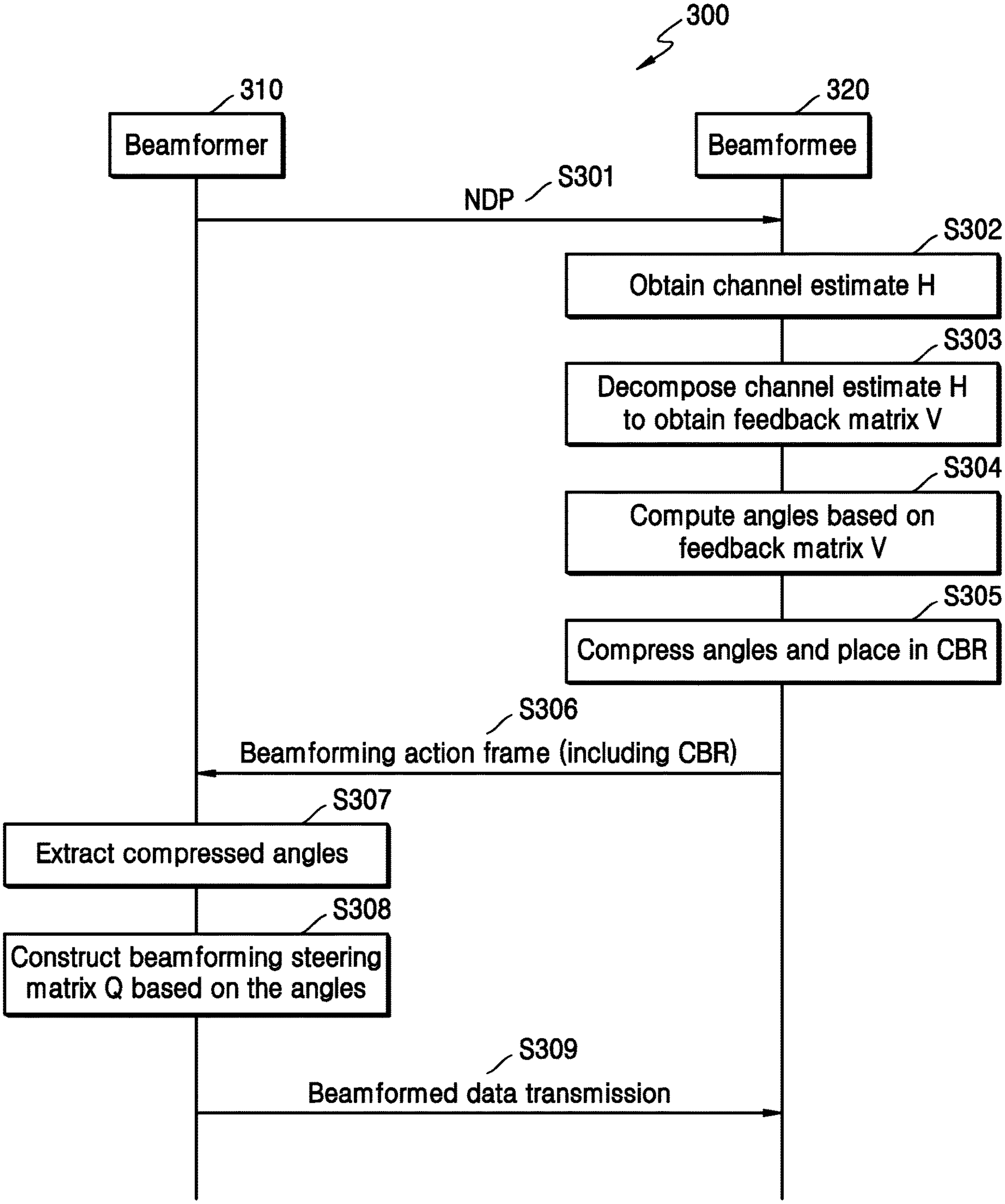
FIG. 3 is a block diagram illustrating an example process for performing beamforming, according to embodiments.
Figure 4:
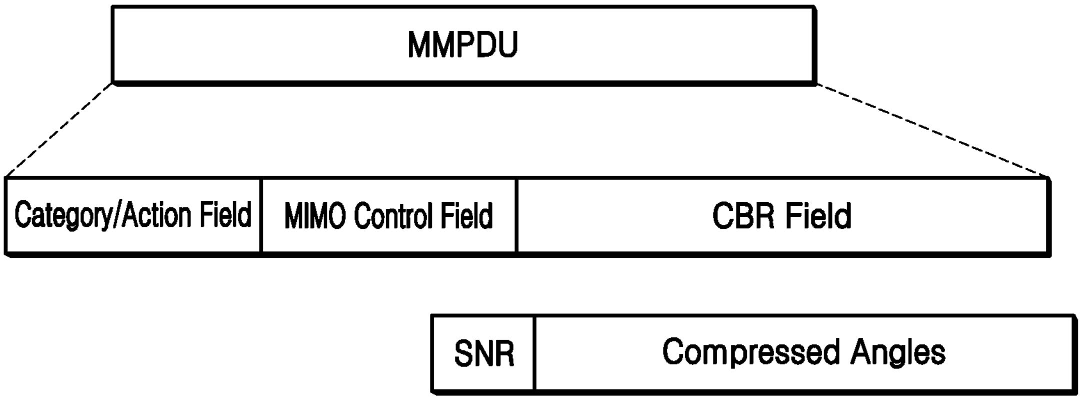
FIG. 4 is a diagram illustrating an example of a beamforming action frame, according to embodiments.

FIG. 3 is a block diagram illustrating an example process for performing beamforming, according to embodiments, and FIG. 4 is a diagram showing an example of a beamforming action frame including a Media Access Control (MAC) Management Protocol Data Unit (MMPDU) which may be used to perform beamforming, according to embodiments. In embodiments, the process 300 illustrated in FIG. 3 may be referred to as Comparative Example 1. As shown in FIG. 3, the process 300 may be performed by a beamformer 310 and a beamformee 320. In embodiments, the beamformer 310 may correspond to an access point. For example, in embodiments the beamformer 310 may correspond to at least one of the first access point AP1 and the second access point AP2. In embodiments, the beamformee 320 may correspond to a station, for example a non-access point station. For example, in embodiments the beamformee 320 may correspond to at least one of the first station STA1, the second station STA2, the third station STA3, and the fourth station STA4 described above.

In embodiments, $N_{Tx}$ may denote a number of antennas at the beamformer 310, $N_{Rx}$ may denote a number of antennas at the beamformee 320. In embodiments, the process 300 may include transmitting, by the beamformer 310, a null data packet (NDP) for channel sounding at operation S301. At beamformee 320, there may be four processing operations performed after receiving the NDP. At operation S302, the beamformee 320 may estimate the channel to obtain a channel estimate matrix H with size $N_{Rx}\times N_{Tx}$ at all active subcarriers. At operation S303, the beamformee 320 may select a number of subcarriers according to grouping parameter $N_g$, and then decompose the channel estimate matrix H for a selected subcarrier to obtain a complex unitary matrix, which may be referred to as a feedback matrix V, with size $N_{Tx}\times N_{Tx}$. For example, the decomposition algorithm used can be singular value decomposition (SVD) performed according to Equation 1 below:

$$H = U\Sigma V^* \qquad \text{(Equation 1)}$$

In Equation 1, "*" may denote conjugate transpose. At operation S304, an angle vector containing multiple angles $\phi$ and $\psi$ may be computed from the first $N_c$ columns of the feedback matrix V using Givens rotation, where $N_c$ denotes the number of spatial streams for the beamformed data transmission, and where $N_c \leq \min(N_{Tx}, N_{Rx})$. At operation S305, the angle vector may be quantized and/or compressed and placed in the compressed beamforming report (CBR) field of the beamforming action frame shown in FIG. 4. In embodiments, an angle $\psi$ may be expressed using $N_b$ bits, and an angle $\phi$ may be expressed using $(N_b+2)$ bits. For each selected subcarrier, the number of bits used for the compressed angles in CBR may be expressed according to Equation 2 below:

$$N_{tot} = N_h N_b + N_h(N_b + 2) \qquad \text{(Equation 2)}$$

In Equation 2, $N_h$ may denote the number of angles for $\phi$ or $\psi$ per selected feedback subcarrier, and may be calculated according to Equation 3 below:

$$N_h = [(N_r - N_c) + (N_r - 1)]N_c/2 \qquad \text{(Equation 3)}$$

In Equation 3, $N_r=N_{Tx}$ may denote the number of rows included in the feedback matrix V. The signal-to-noise ratio (SNR) field in the CBR may be obtained from $\Sigma$, which may be an indication of the signal quality of the $N_c$ spatial streams. At operation S306, a beamforming action frame, which may include the CBR as shown for example in FIG. 4, may be transmitted by the beamformee 320. At the beamformer 310, there may be two processing operations performed after the beamforming action frame is received. At operation S307, the angle vector corresponding to the first $N_c$ columns of the feedback matrix V may be extracted from the CBR, and then in operation S308, a steering matrix Q with size $N_r\times N_c$ may be constructed. At operation S309, the steering matrix Q may be used to perform beamforming on data transmitted to the beamformee 320. In embodiments, the first $N_c$ columns of the feedback matrix V may be denoted as $V(:,1{:}\ N_c)$. As the number of antennas increases, the number of bits used for the compressed angles in the CBR may increase, which may create a significant amount of overhead.

Figure 5A:
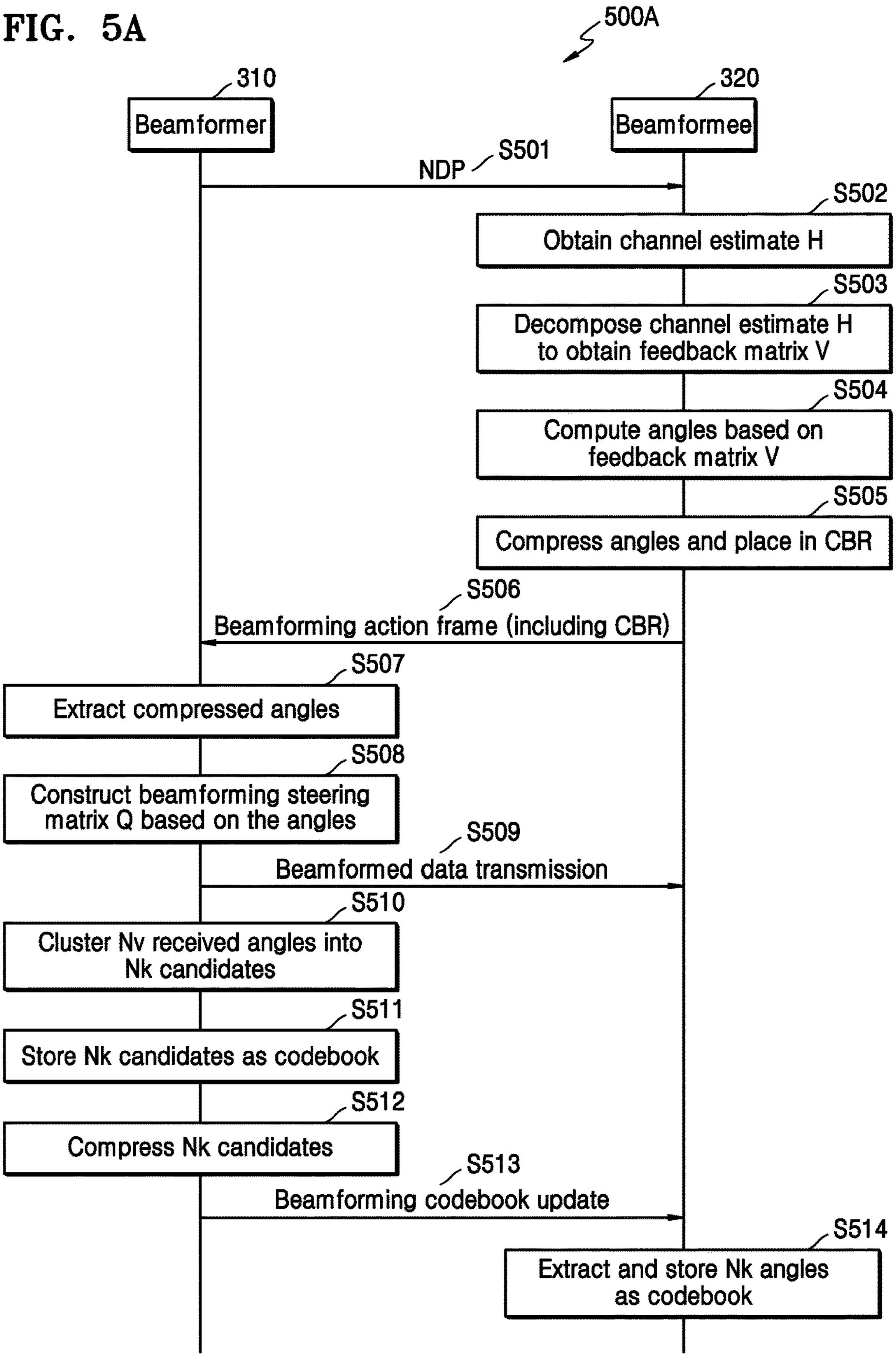
FIG. 5A is a block diagram illustrating an example process for generating a beamforming codebook, according to embodiments.
Figure 5B:
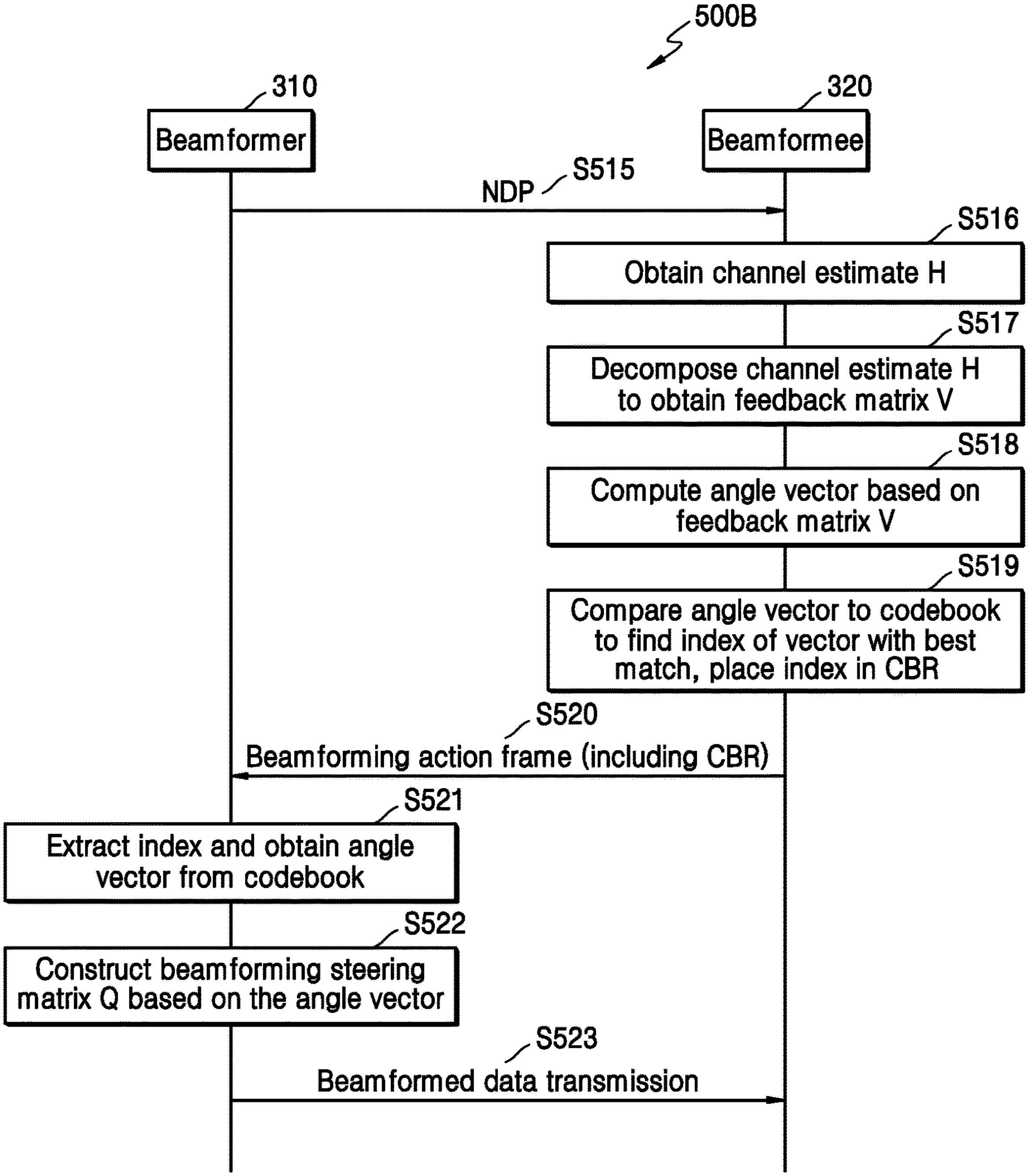
FIG. 5B is a block diagram illustrating an example process for performing beamforming, according to embodiments.

FIG. 5A is a block diagram illustrating an example process for generating a beamforming codebook, according to embodiments. FIG. 5B is a block diagram illustrating an example process for performing beamforming, according to embodiments. As shown in FIGS. 5A and 5B, the processes 500A and 500B may be performed by the beamformer 310 and the beamformee 320. In embodiments, the processes 500A and 500B illustrated in FIGS. 5A and 5B may be referred to as Comparative Example 2. For example, the process 500A may be referred to as a training phase of Comparative Example 2, and the process 500B may be referred to as a beamforming phase of Comparative Example 2.

In embodiments, Comparative Example 2 may relate to beamforming using artificial intelligence (AI) and/or machine learning (ML), which may be referred to as AIML beamforming. Comparative Example 2 may differ from Comparative Example 1 in that Comparative Example 2 may relate to beamforming which is performed using a codebook, which may be constructed in the training phase of Comparative Example 2.

As shown in FIG. 5A, the process 500A may use operations similar to the operations of the process 300, which may be used to construct the codebook at both the beamformer 310 and the beamformee 320. For example, the operations S501-S509 of the process 500A may correspond to the operations S301-S309 of the process 300, and so redundant or duplicative descriptions of these operations are omitted herein. According to Comparative Example 2, at operation S510, $N_v$ angle vectors may be received from all selected subcarriers and stored during the operations S501-S509, where each angle vector may contain angles $\phi$ and $\psi$ and may have $2N_h$ real values. At operation S510, the $N_v$ angle vectors may be clustered into $N_k$ candidate vectors, where $N_k=2^{N_{fb}}$, and where $N_{fb}$ may denote a system design parameter representing the number of feedback bits for AIML beamforming feedback per subcarrier per vector index. In embodiments, the clustering may be performed using at least one of an AI technique and an ML technique. For example, the clustering may be performed using a k-means algorithm.

At operation S511, the codebook may be stored in the beamformer 310 as a $(2N_h)\times N_k$ real-value matrix D, each column of which may be a candidate angle vector. At operation S512, the codebook including the $N_k$ candidate vectors may be compressed, and at operation S513 the codebook may be transmitted to the beamformee 320. In embodiments, $N_b$ bits may be used to compress an angle $\psi$ and $(N_b+2)$ bits may be used to compress an angle $\phi$, as discussed above with respect to Comparative Example 1. Therefore, the data amount used for codebook delivery may be $N_hN_kN_b+N_hN_k(N_b+2)$ bits. Once the codebook is received by the beamformee 320, it may be stored at operation S514.

Once the training phase is complete, for example according to the process 500A, and the codebook is available at both beamformer 310 and beamformee 320, the beamforming phase may be performed, for example according to the process 500B illustrated in FIG. 5B. As shown in FIG. 5B, the process 500B may use some operations similar to the operations of the process 300. For example, the operations S515-S518 of the process 500B may correspond to the operations S301-S304 of the process 300, and so redundant or duplicative descriptions of these operations are omitted herein. At operation S519, an index representing a candidate angle vector in the codebook may be sent in the CBR, instead of the compressed angles as discussed above with respect to the process 300. For example, according to Comparative Example 2, a $N_{fb}$ bits index $n_{(\phi,\psi)}$ may replace the "Compressed Angles" field in the CBR depicted in FIG. 4. Because the index may be expressed using only $N_{fb}$ bits, this may be significantly less than $N_{tot}$ bits required in the CBR of Comparative Example 1, per feedback subcarrier. Because the value of $N_{fb}$ may affect the account of overhead for codebook update and CBR, and may affect the packet error rate (PER) performance of beamformed data transmissions, it may be carefully selected to maximize the over-all system throughput. According to embodiments, one example method of finding the index $n_{(\phi,\psi)}$ is to find the candidate vector in the codebook D that has the best match with the received angle vector $v_{(\phi,\psi)}$ with size $(2N_h)\times 1$ according to Equation 4 below:

$$n_{(\phi,\psi)} = \underset{i}{\operatorname{argmin}}\|v_{(\phi,\psi)} - D(:, i)\|^2,\ i \in [1, N_k] \quad \text{(Equation 4)}$$

In embodiments, the index searching for all subcarriers in a CBR may use the same codebook D. After the beamforming action frame is transmitted to the beamformer 310 at operation S520, the index may be used to find the angle vector from codebook, and the angle vector may be used to construct the steering matrix Q at operations S521 and S522, which may correspond to operations S307 and S308 of the process 300. The steering matrix Q may be used to perform beamforming on the data transmitted at operation S523, which my correspond to operation S309 of the process 300.

According to embodiments, beamforming may be performed using a CBR format which is different from the CBR formats discussed above. For example, embodiments may relate to Example 1 described below, in which the CBR may contain two indices for two types of angles, respectively, unlike Comparative Example 2, in which only a single index is used for both angles. In embodiments, beamforming according to Example 1 may provide better goodput than Comparative Example 2 in lower SNR ranges (for example SNR<20 dB), but slightly worse goodput in higher SNR ranges (for example SNR>20 dB).

According to embodiments, beamforming may be performed using a codebook which is different from the codebooks discussed above. For example, embodiments may relate to Example 2 described below, in which a steering matrix is used to directly construct the codebook, unlike Comparative Example 2 in which angle information is used to construct the codebook. In embodiments, beamforming according to Example 2 may provide better goodput than Comparative Example 2 in all SNRs, and may reduce the complexity in CBR generation at the beamformee 320 by nearly 50% in higher SNR ranges (for example SNR>20 dB), compared with Comparative Example 2.

Figure 6:
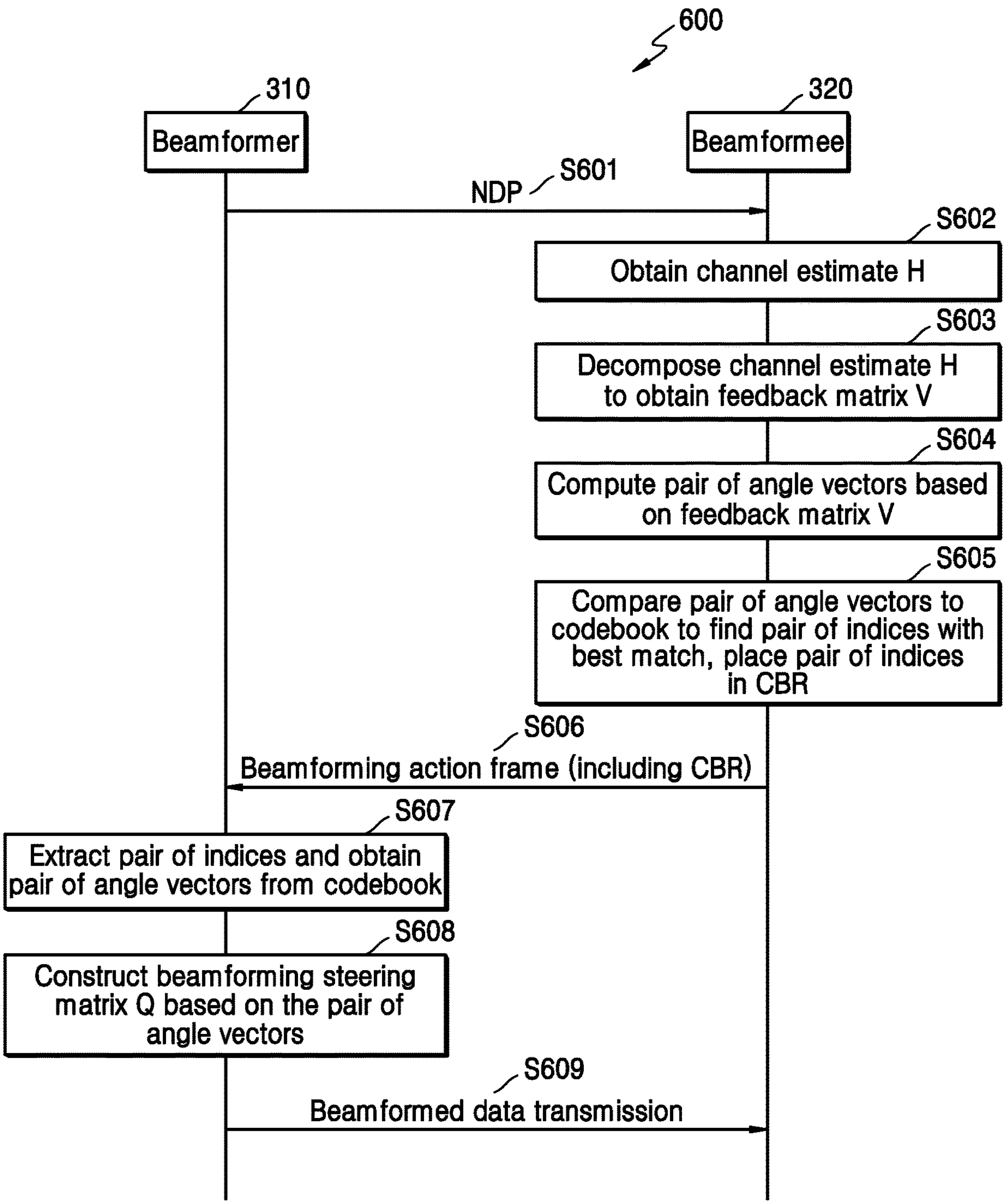
FIG. 6 is a block diagram illustrating an example process for performing beamforming, according to embodiments.

FIG. 6 is a block diagram illustrating an example process for performing beamforming, according to embodiments. As shown in FIG. 6, the process 600 may be performed by the beamformer 310 and the beamformee 320. In embodiments, the process 600 illustrated in FIG. 6 may correspond to Example 1.

According to Comparative Example 2, the length of the angle vectors to be clustered is $2N_h$ which represents both $\psi$ or $\phi$ computed from the feedback matrix V. In contrast, for Example 1, the length of the angle vectors to be clustered is NA which may represent either $\psi$ or $\phi$. For example, according to Comparative Example 1, if M angle vectors are collected, $N_v$=M. However, according to Example 1, $N_v$=2 M, because a received angle vector such as those used in Comparative Example 1 may be divided into two vectors that representing $\psi$ and $\phi$, respectively. As a result, the size of the real-value codebook D becomes $N_h\times N_k$. When delivering the data to the beamformee 320, all of the angle values in the codebook may use $(N_b+2)$ bits for compression, because after clustering, the transceivers may be unable to determine whether a value represents $\psi$ or $\phi$. In embodiments, the amount of data used for a codebook update may therefore be reduced to $N_hN_k(N_b+2)$ bits per subcarrier.

As shown in FIG. 6, the process 600 may use operations similar to the operations of the process 300. For example, the operations S601-S604 of the process 600 may correspond to the operations S301-S304 of the process 300, and so redundant or duplicative descriptions of these operations are omitted herein. At operation S605, two index searching may be performed by the beamformee 320 according to Equation 5 below:

$$n_\psi = \underset{i}{\operatorname{argmin}}\{\|v_\psi - D(:, i)\|^2\},\qquad \text{(Equation 5)}$$

$$n_\phi = \underset{i}{\operatorname{argmin}}\{\|v_\phi - D(:, i)\|^2\}$$

In Equation 5, vectors $v_\psi$ and $v_\phi$ may have size $N_h \times 1$, $i \in [1, N_k]$. Example 1 may differ from Comparative Example 2 in that two indices $n_\psi$ and $n_\phi$ representing two angle vectors for 0 and 0 may transmitted in the CBR, respectively. Thus, the number of feedback bits increases from $N_{fb}$ to $2N_{fb}$ per subcarrier. Accordingly, in Example 1, the communication overhead is transferred from codebook overhead to CBR overhead. This feature may be useful to maximize the overall system throughput when codebook updates are performed more frequently, and/or when $N_{fb}$ is relatively large. In addition, Example 1 may allow a smaller codebook to be used in comparison with Comparative Example 2. After the beamforming action frame including the CBR which includes the two indices is transmitted the beamformer 310 at operation S606, the two indices may be used to find the two angle vectors from the same codebook at operation S607, the steering matrix Q may be constructed at operation S608, and may be used to perform beamforming on the data transmitted to the beamformee 320 at operation S609.

Figure 7A:
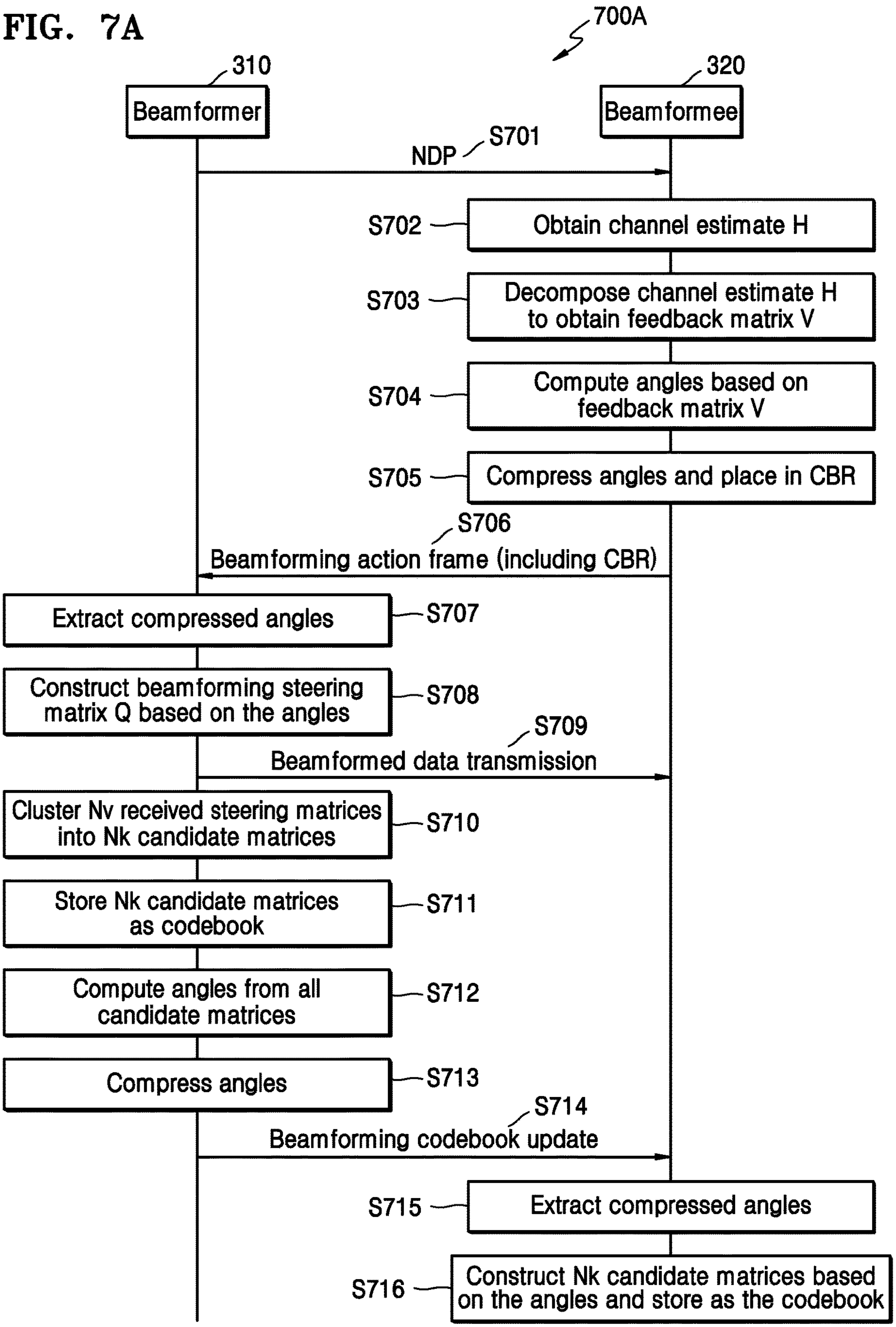
FIG. 7A is a block diagram illustrating an example process for generating a beamforming codebook, according to embodiments.
Figure 7B:
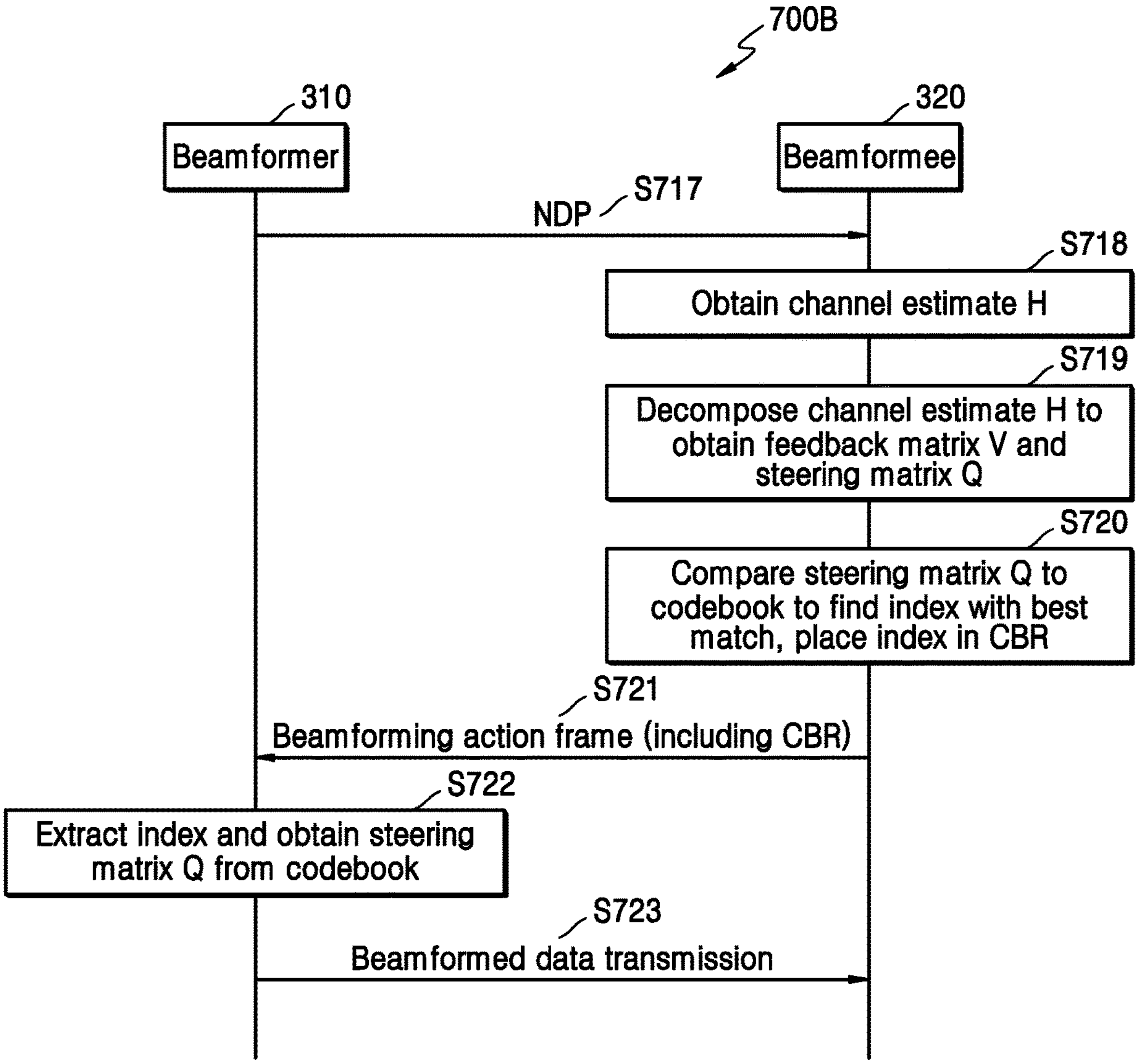
FIG. 7B is a block diagram illustrating an example process for performing beamforming, according to embodiments.

FIG. 7A is a block diagram illustrating an example process for generating a beamforming codebook, according to embodiments. FIG. 7B is a block diagram illustrating an example process for performing beamforming, according to embodiments. As shown in FIGS. 7A and 7B, the processes 700A and 700B may be performed by the beamformer 310 and the beamformee 320. In embodiments, the processes 700A and 700B illustrated in FIGS. 7A and 7B may correspond to Example 2. For example, the process 700A may be referred to as a training phase of Example 2, and the process 700B may be referred to as a beamforming phase of Example 2.

As shown in FIG. 7A, the process 700A may use operations similar to the operations of the process 300 to construct the codebook at both the beamformer 310 and the beamformee 320. For example, the operations S701-S709 of the process 700A may correspond to the operations S301-S309 of the process 300, and so redundant or duplicative descriptions of these operations are omitted herein. In embodiments, Example 2 may differ from Comparative Example 2 in the type of data stored in the codebook and the method of codebook construction. According to Example 2, at operation S710 the codebook may be constructed by clustering $N_v$ steering matrices obtained during operations S701-S709, rather than clustering the angle vectors as in Comparative Example 2 and Example 1. Before clustering is performed, a $N_r \times N_c$ complex-value steering matrix Q may be re-organized into a real-value vector containing the real and imaginary values of the elements in a steering matrix Q. Because the last row of a steering matrix Q may be real-values, the number of real-values used to represent a steering matrix Q may be $P=2N_rN_c-2$. After clustering, the size of the codebook may be $P \times N_k$. After the codebook is stored at operation S711, the codebook may be transmitted to the beamformee 320 by computing and compressing the angles of each steering matrix Q in the codebook at operations S712 and S713, which may correspond to operation S512 discussed above. In embodiments, $N_b$ bits may be used to compress an angle $\psi$ and $(N_b+2)$ bits may be used to compress angle $\phi$. Therefore, for a given $N_{fb}$, the amount of data for codebook update in process 700A may be the same as that in the process 500A. After the beamforming codebook update is transmitted to the beamformee 320 at operation S714, the received angles may be extracted and used to reconstruct the codebook in the form of steering matrices Q at operations S715 and S716.

As shown in FIG. 7B, the process 700B may use operations similar to the operations of the process 300. For example, the operations S717-S718 of the process 700B may correspond to the operations S301-S303 of the process 300, and so redundant or duplicative descriptions of these operations are omitted herein. In embodiments, Example 2 may differ from Comparative Example 1 and Example 1 in that the beamformee 320 may not compute angle vectors from the feedback matrix V. Instead, at operation S719, the steering matrix Q may be determined, and at operation S720 the steering matrix $Q=V(:,1{:}\ N_c)$ may be converted into a $P \times 1$ vector $v_Q$, which may then be used for candidate searching from the codebook according to Equation 6 below:

$$n_Q = \underset{i}{\operatorname{argmin}}\{\|v_Q - D(:, i)\|^2\}\qquad \text{(Equation 6)}$$

In Equation 6, $n_Q$ may denote an index representing a selected steering matrix Q, which be transmitted in the CBR included in the beamforming action frame at operation S721. Therefore, for a given $N_{fb}$, the amount of data used to send the index in the beamforming phase may be the same as in Comparative Example 2. At the beamformer 310, the received index may be used to find the steering matrix Q from the codebook at operation S722, and the steering matrix Q may be used to perform beamforming on the data transmitted at operation S723. Accordingly, Example 2 may differ from Comparative Example 2 and Example 1 in that there is no need to construct steering matrix Q from angles, which may save computational steps during the process 700B.

Table 1 below shows a comparison between examples of the codebook and CBR requirements for the beamforming methods discussed above. In embodiments, the "Compressed Angles" field in the CBR may be replaced by the indices of Comparative Example 2, Example 1, and Example 2.

TABLE 1

Codebook and CBR comparison for various beamforming methods

| Beamforming method | Number of bits to be transmitted per codebook update | Number of real values in codebook | Number of bits in "Compressed Angles" field of CBR, per subcarrier |
|---|---|---|---|
| Comparative Example 1 | 0 | N/A | $N_{tot}$ |
| Comparative Example 2 | $N_hN_kN_b$ + $N_hN_k(N_b + 2)$ | $(2N_h) \times N_k$ | $N_{fb}$ |
| Example 1 | $N_hN_k(N_b + 2)$ | $N_h \times N_k$ | $2N_{fb}$ |
| Example 2 | $N_hN_kN_b$ + $N_hN_k(N_b + 2)$ | $(2N_rN_c - 2) \times N_k$ | $N_{fb}$ |

Figure 8:
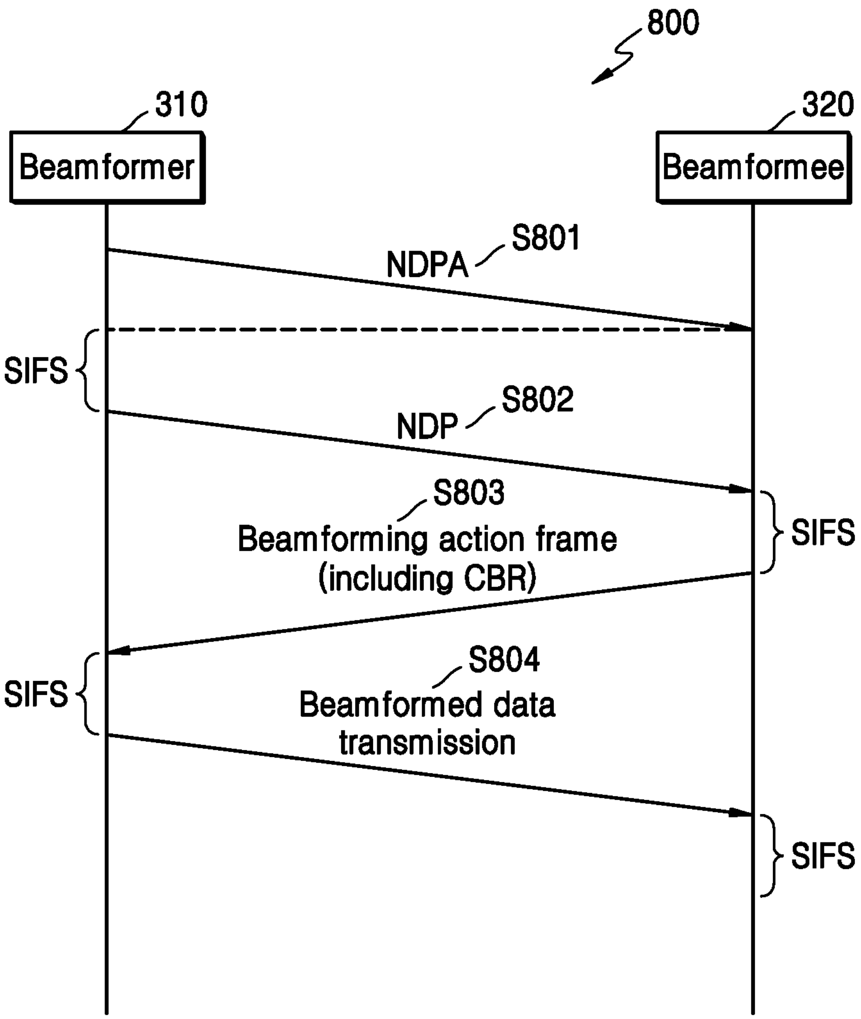
FIG. 8 is a block diagram illustrating an example process for measuring beamforming performance, according to embodiments.

FIG. 8 is a block diagram illustrating an example process for measuring and comparing beamforming performance, according to embodiments. As shown in FIG. 8, the process 800 may be performed by the beamformer 310 and the beamformee 320. As shown in FIG. 8, the process 800 may include transmitting an NDP announcement (NDPA) frame at operation S801, transmitting an NDP frame at operation S802, transmitting a beamforming action frame (including CBR) at operation S803, and performing beamforming on data transmitted at operation S804. In embodiments, each of the operations S801-S804 may be separated by a Short Interframe Space (SIFS), which may be used by the beamformer 310 and/or the beamformee 320 to perform one or more operations discussed above with respect to FIGS. 1-7B.

FIGS. 9A-9B, 10A-10F, and 11 are graphs illustrating examples of beamforming performance, according to embodiments. Table 2 below shows a comparison between examples of system and simulation parameters for the performance evaluation shown in FIGS. 9A-9B, 10A-10F, and 11.

TABLE 2

Considered system parameters for performance evaluation

| Parameters | Values |
|---|---|
| Packet format | HE (11ax) |
| Bandwidth | 20 (MHz) |
| Channel | 802.11 Channel-D |
| MPDU size for beamformed data transmission ($B_{MPDU}$) | 1000 (bytes) |
| Feedback subcarrier grouping ($N_g$) | 4 |
| Number of feedback subcarriers ($N_{sc}$) | 64 |
| Number of bits to compress ψ ($N_b$) | 4 (bits) |
| Number of Antennas at beamformer 310 ($N_r$) | 8 |
| Number of Antennas at beamformee 320 ($N_c$) | 2 |
| Number of angles for ψ or ϕ ($N_h$) | 13 |
| Number of spatial streams for both beamforming action frame & beamformed data transmission (NSS) | 2 |
| MCS for both beamforming action frame & beamformed data transmission | 0-11 |
| NDPA duration | 28 (μs) |
| NDP duration | 168 (μs) |
| SIFS duration | 16 (μs) |
| $N_{fb}$ (For Comparative Example 2, Example 1, and Example 2) | 11-16 (bits) |

In embodiments, the goodput (Mbits/sec) may refer to the successfully delivered user data in a given duration T, and may be determined according to Equation 7 below:

$$G = \frac{8FB_{MPDU}(1 - PER_{BF})}{T} \quad \text{(Equation 7)}$$

In Equation 7 above, G may denote the goodput, $T=T_{DB}+FT_{BF}$ may denote a period containing a single codebook update and $T_{DB}$ may denote the air time used to complete the update, F may denote the number of beamforming cycles in the period. A beamforming cycle may use air time $T_{BF}$ and may correspond to the process 800 of FIG. 8, and $PER_{BF}$ may denote the PER corresponding to operation S804. In embodiments, the codebook update of the process 800 may use beamforming cycles corresponding to Comparative Example 1. The data used per codebook update (shown in the first column of Table 1) may be divided into multiple MPDUs for transmission in multiple legacy beamforming cycles, respectively. For a given T, the system goodput may be jointly determined by $T_{DB}$, $T_{BF}$ and $PER_{BF}$, where $T_{BF}$ may be further affected by the duration of beamforming action frame $T_{CBR}$ and the duration of the beamformed data frame $T_{BF\text{-}DA}$. For Comparative Example 1, $T_{DB}=0$, and thus Equation 7 reduces to Equation 8 below:

$$G = \frac{8B_{MPDU}(1 - PER_{BF})}{T_{BF}} \quad \text{(Equation 8)}$$

Figure 9A:
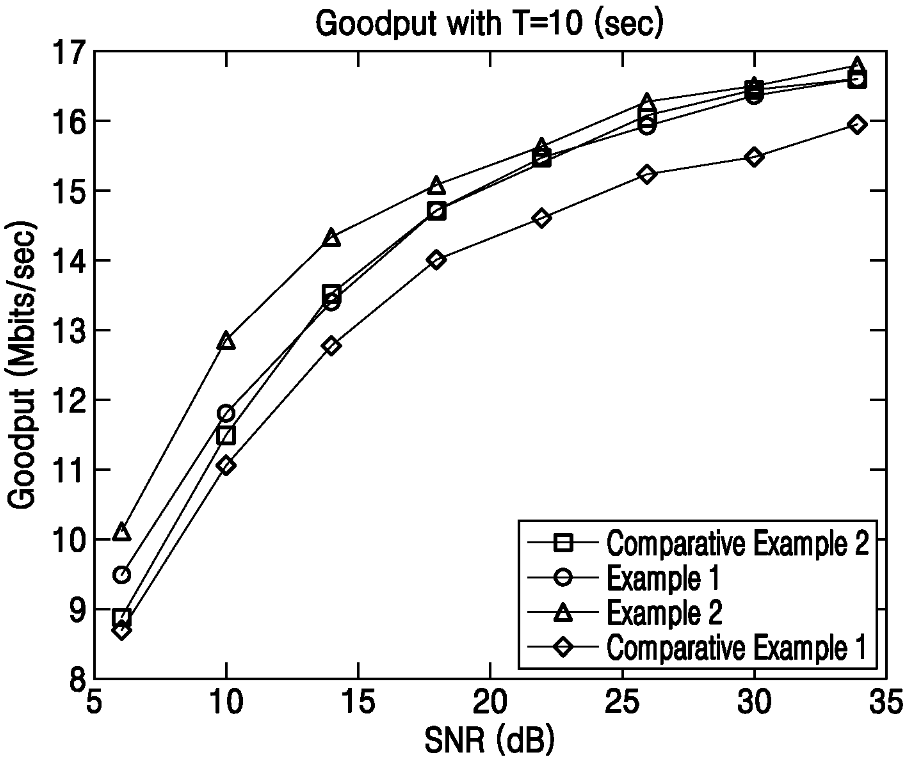
FIGS. 9A-9B, 10A-10F, and 11 are graphs illustrating examples of beamforming performance, according to embodiments.
Figure 9B:
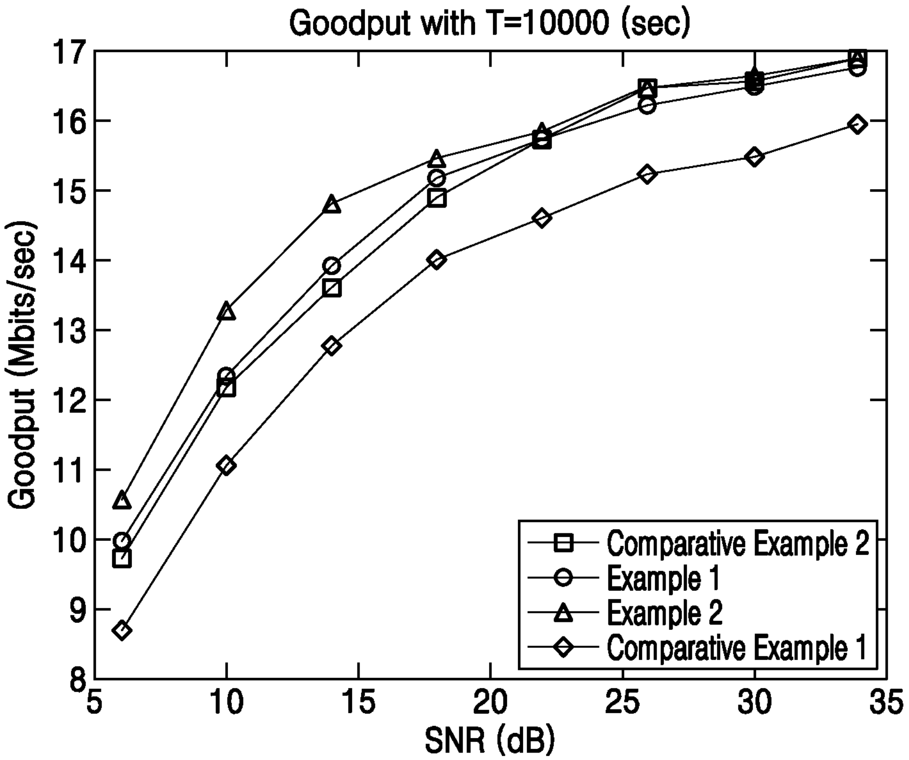

An example goodput comparison is shown in FIGS. 9A-9B. According to the example goodput comparison, codebooks for Comparative Example 2, Example 1, and Example 2 is constructed from Example 1 CBR over 3000 channel realization at SNR=23 dB. Then, the goodput is evaluated from 1000 channel realization at SNRs range from 6 to 34 dB. For Comparative Example 2, Example 1, and Example 2, the goodput is evaluated for all $N_{fb}$ in Table 2 and then the design parameter $N_{fb}$ with the largest goodput is used as the final result. As shown in FIGS. 9A-9B, with two values of T, Example 1 outperforms Comparative Example 2 slightly at lower SNR ranges, but performs slightly worse at higher SNR ranges. Example 1 outperform Comparative Example 2 at all SNR ranges, and the gain is larger at lower SNR ranges.

Figure 10A:
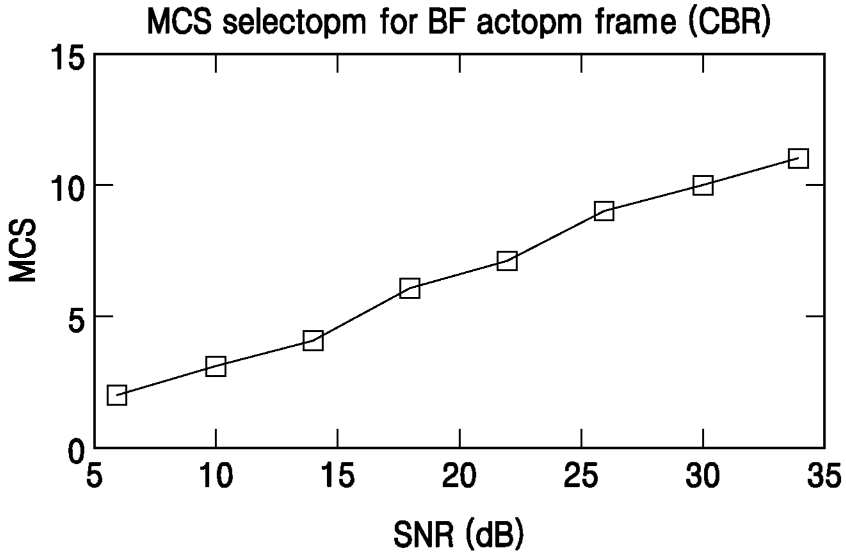
Figure 10B:
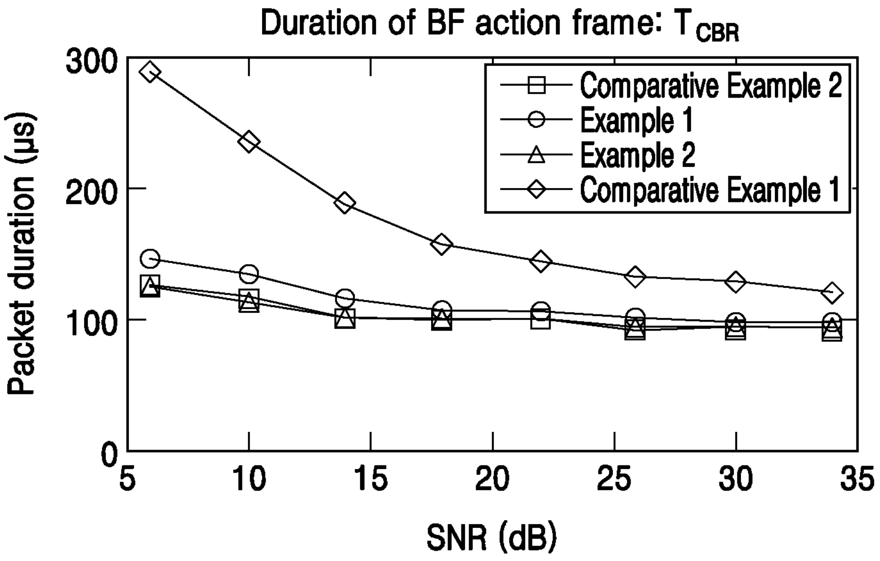

Table 3 and FIGS. 10A-10F provide more details on various parameters and their interactions in the above goodput results when T=10000 (sec). For example, FIG. 10B shows that Comparative Example 2 and Example 2 have the smallest air time of beamforming action frame, because a single index is used for feedback per subcarrier, and that Example 1 has slightly larger air time due to two-index feedback. Comparative Example 1 has the largest air time overhead, and this is more significant in lower SNR ranges as smaller MCS is used, as shown in FIG. 10A.

Figure 10C:
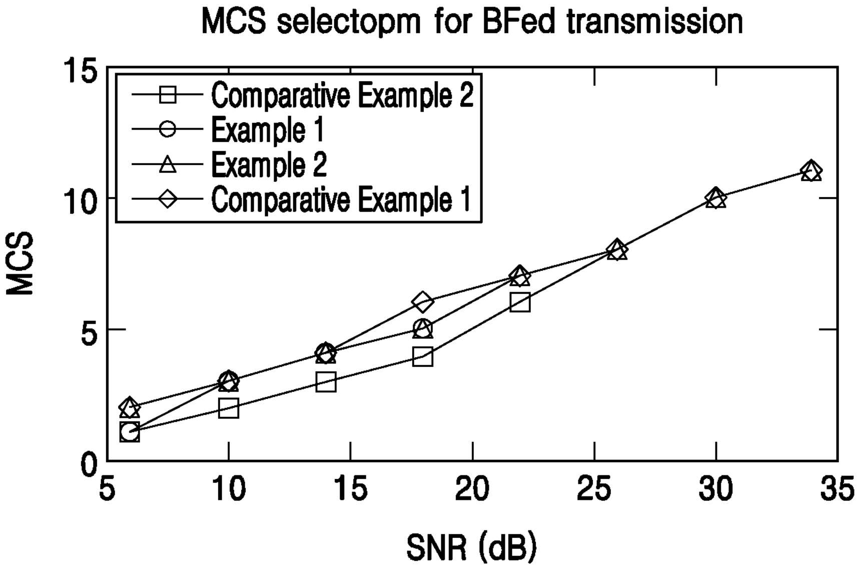
Figure 10D:
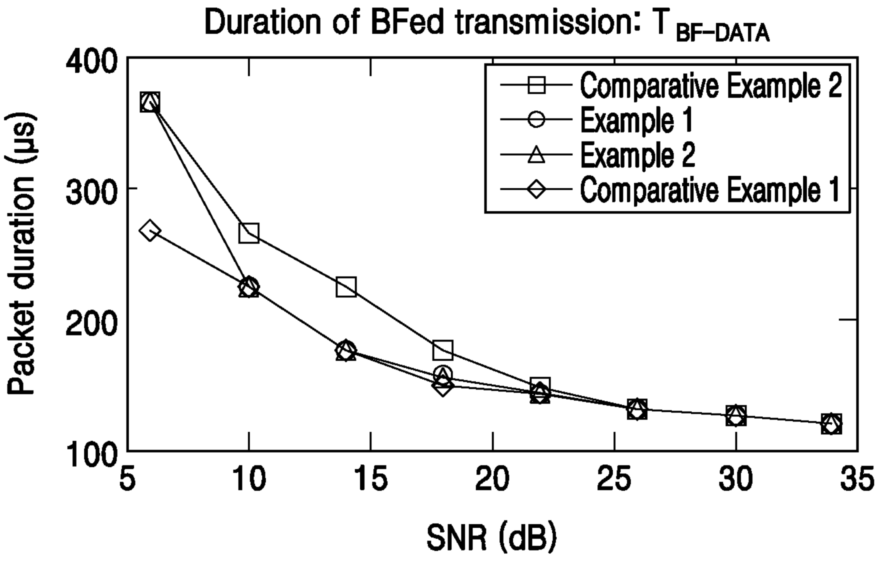
Figure 10E:
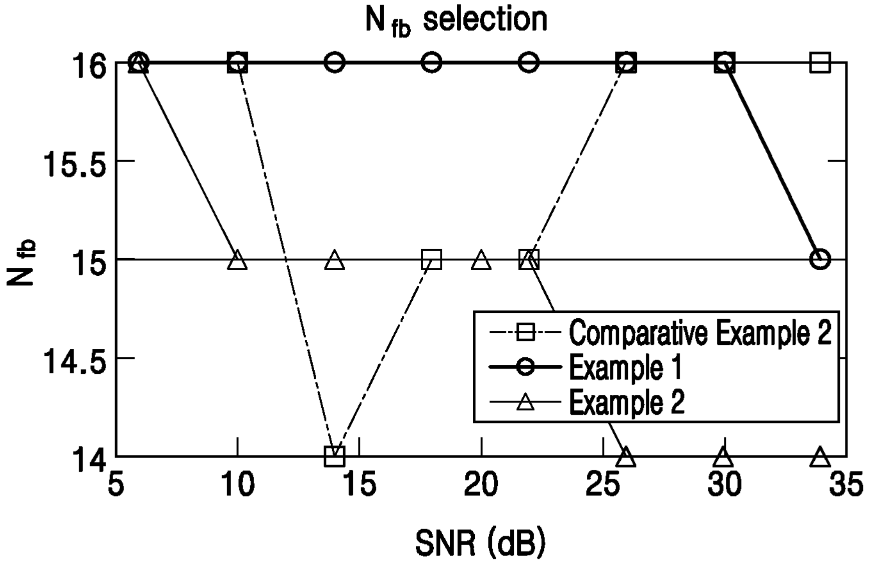

FIGS. 10C-10D show that Example 1 and Example 2 select higher MCS (thus lower duration in beamformed transmission) than that in Comparative Example 2, in lower SNR ranges.

Figure 10F:
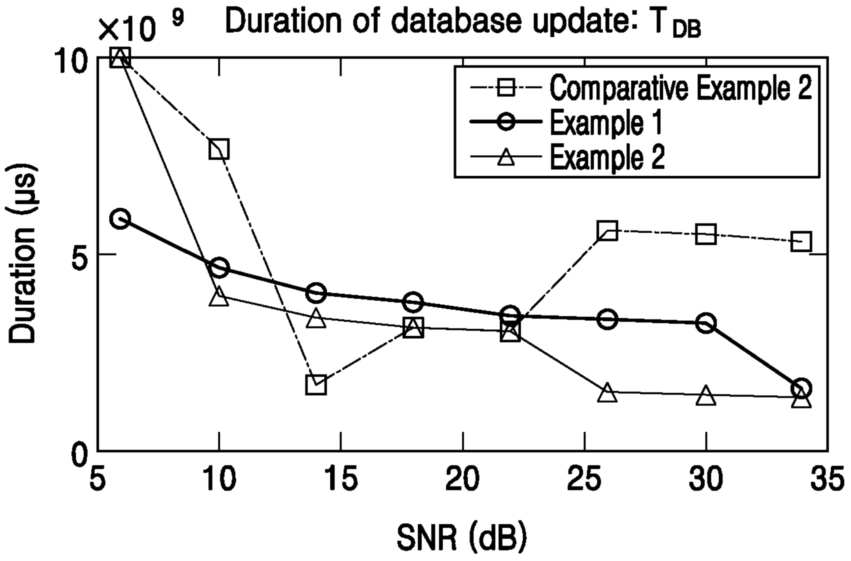

FIG. 10F shows the air time of codebook update is less than 1 sec which can be ignored compared to T.

TABLE 3

Factors that affecting various system parameters

| Parameter | Factors affecting the parameter's value |
|---|---|
| $T_{CBR}$ (μs) | Selected MCS (The selection policy may ensure that the PER is 0 and the frame duration is minimized for Comparative Example 1, note that this MCS is the same for all beamforming methods)<br>SNR (affects the MCS selection above)<br>Number of bits in CBR defined in the $4^{th}$ column of Tab. 1 for a particular beamforming method |
| $T_{BF\text{-}DATA}$ (μs) | Selected MCS (The selection policy may maximize $8B_{MPDU}(1 - PER_{BF})/T_{BF}$, this MCS may be different for different beamforming methods) |
| $T_{DB}$ (μs) | The amount of bits required per codebook, as shown in the second column of Table 1<br>Duration of the Comparative Example 1 beamforming action frame (affected by MCS)<br>Duration of the Comparative Example 1 beamformed data frame (affected by MCS)<br>PER of the Comparative Example 1 beamformed data transmission (packet loss increases the beamforming cycles to deliver the codebook) |

Figure 11:
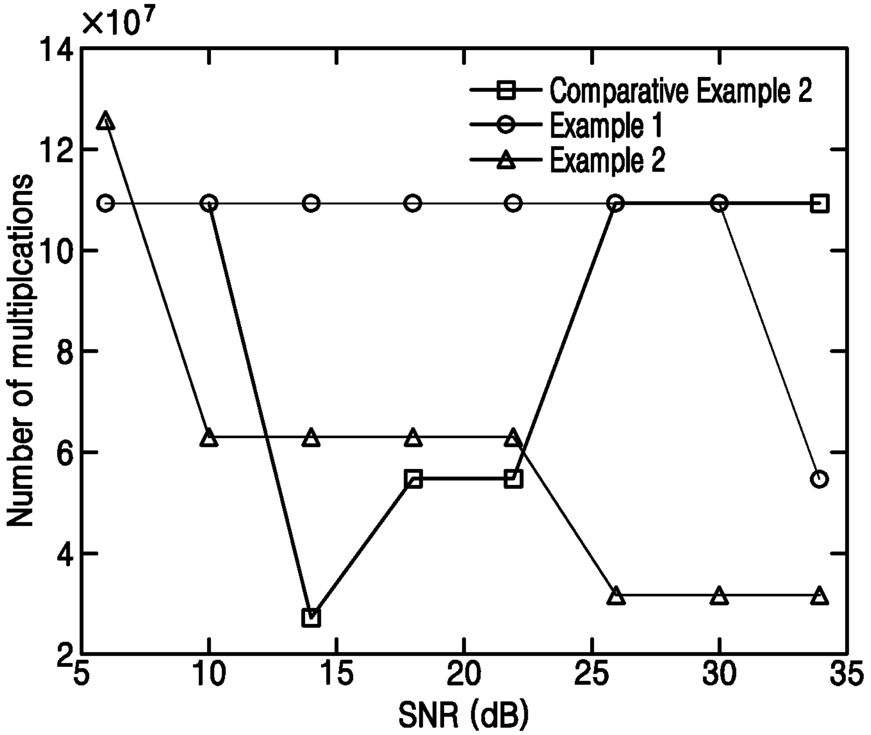

Table 4 shows a comparison of an example of a complexity comparison of CBR generation in Comparative Example 2, Example 1, and Example 2 in terms of angle computation from the feedback matrix V and the index searching. The other steps such as channel estimation and decomposition to obtain the feedback matrix V may be the same for all beamforming methods. An example of a complexity comparison is shown in FIG. 11 using the system parameters in Table 2 and the selected $N_{bf}$ in FIG. 10E. As can be seen in FIG. 11, Example 2 reduces the complexity by nearly 50% at higher SNR ranges (for example 20-35 dB), because a smaller $N_{bf}$ is selected. In the example of FIG. 11, the complexity may be dominated by the index searching step, due to a large value of $N_k$. In embodiments, this can be significant reduced by applying a different searching metric to remove multiplications, e.g., use the sum of absolute value $\Sigma|v-D(:, i)|$ to replace the Euclidean distance $\|v-D(:, i)\|^2$.

TABLE 4

CBR generation complexity comparison of Comparative Example 2, Example 1, and Example 2

| Beamforming method | Number of multiplications in angle computation per CBR generation | Number of multiplications in candidate indices searching per CBR generation |
|---|---|---|
| Comparative Example 2 | $N_r N_c(1 + 4N_c + 4N_r N_r N_c - 2N_r N_c(N_c + 1))$ | $2N_h N_k N_{sc}$ |
| Example 1 | Same as above | Same as above |
| Example 2 | 0 | $(2N_r N_c - 2)N_k N_{sc}$ |

Figure 12:
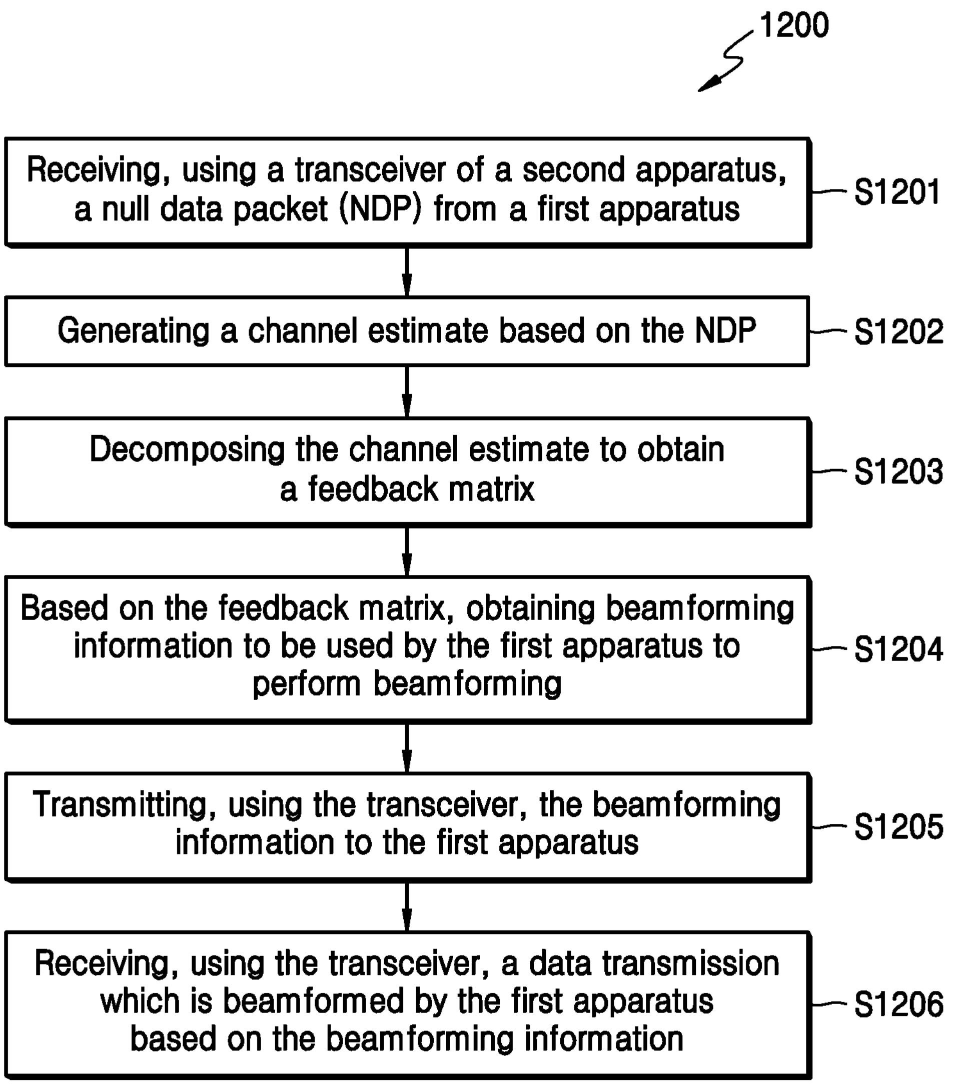
FIGS. 12-13 are block diagrams illustrating example processes for performing beamforming, according to embodiments.
Figure 13:
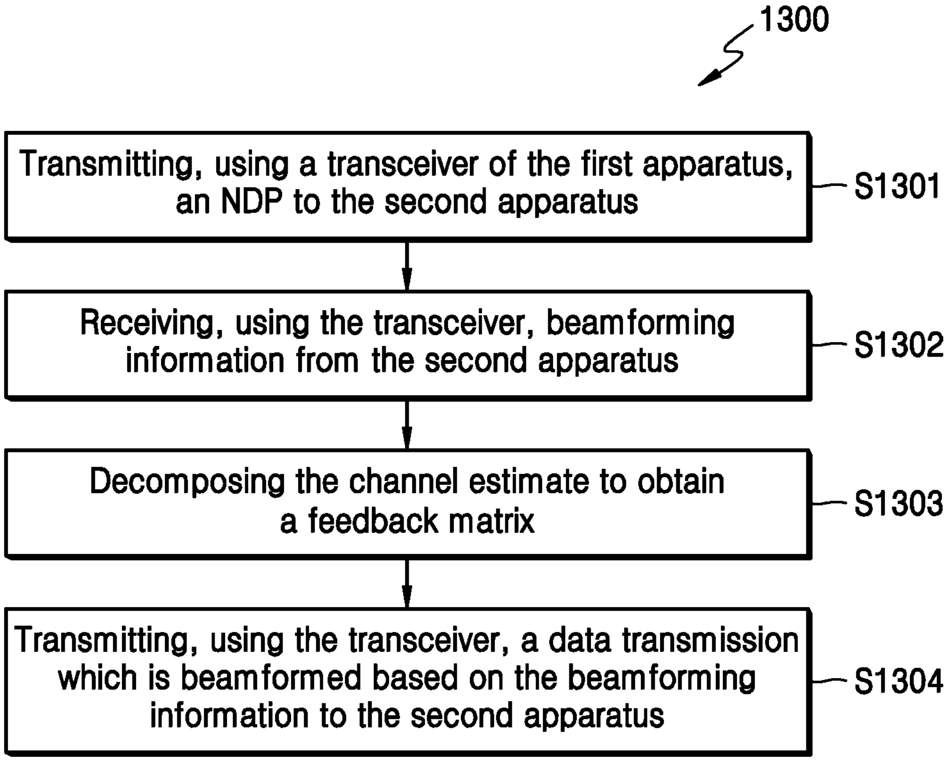

FIGS. 12-13 are block diagrams illustrating example processes for performing beamforming, according to embodiments. In embodiments, the process 1200 illustrated in FIG. 12 and the process 1300 illustrated in FIG. 13 may be performed by the any of the elements described above with respect to FIGS. 1-11. For example, the process 1200 illustrated in FIG. 12 may be performed by the beamformee 320, and the process 1300 illustrated in FIG. 13 may be performed by the beamformer 310.

FIG. 12 is a flowchart of a process 1200 for controlling a second apparatus configured to communicate with a first apparatus in a WLAN, according to embodiments. In embodiments, the first apparatus may correspond to the beamformer 310, and the second apparatus may correspond to the beamformee 320

As shown in FIG. 12, at operation S1201 the process 1200 may include receiving, using a transceiver of the second apparatus, an NDP from the first apparatus. In embodiments, the transceiver of the second apparatus may correspond to one of the transceiver 21_4 and the transceiver 22_4.

As further shown in FIG. 12, at operation S1202 the process 1200 may include generating a channel estimate based on the NDP. In embodiments, the channel estimate may correspond to the channel estimate matrix H discussed above.

As further shown in FIG. 12, at operation S1203 the process 1200 may include decomposing the channel estimate to obtain a feedback matrix. In embodiments, the feedback matrix may correspond to the feedback matrix V discussed above.

As further shown in FIG. 12, at operation S1204 the process 1200 may include based on the feedback matrix, obtaining beamforming information to be used by the first apparatus to perform beamforming. In embodiments, the beamforming information may include at least one from among: a pair of angle indices which indicate a pair of angle vectors to be used by the first apparatus to beamform the data transmission, and a steering matrix index which indicates a steering matrix to be used by the first apparatus to beamform the data transmission. In embodiments, the pair of angle vectors may correspond to the angles θ and ψ discussed above, and the steering matrix may correspond to the steering matrix Q discussed above.

As further shown in FIG. 12, at operation S1205 the process 1200 may include transmitting, using the transceiver, the beamforming information to the first apparatus.

As further shown in FIG. 12, at operation 1207 the process 1200 may include receiving, using the transceiver, a data transmission which is beamformed by the first apparatus based on the beamforming information.

In embodiments, the beamforming information may be obtained from a beamforming codebook stored in the second apparatus.

In embodiments, the beamforming codebook may be obtained based on codebook update information received from the first apparatus using the transceiver.

In embodiments, the process 1200 may further include computing the pair of angle vectors based on the feedback matrix.

In embodiments, the pair of angle vectors may include a first angle vector and a second angle vector, the pair of angle indices may include a first angle index which indicates the first angle vector, and a second angle index which indicates the second angle vector, and the obtaining of the beamforming information may include obtaining the first angle index based on a comparison between the first angle vector and the beamforming codebook, and obtaining the second angle index based on a comparison between the second angle vector and the beamforming codebook.

In embodiments, the method may further include obtaining the steering matrix based on the feedback matrix.

In embodiments, the obtaining of the beamforming information may include obtaining the steering matrix index based on a comparison between the steering matrix and the beamforming codebook.

FIG. 13 is a flowchart of a process 1300 for controlling a first apparatus configured to communicate with a second apparatus in a WLAN, according to embodiments. In embodiments, the first apparatus may correspond to the beamformer 310, and the second apparatus may correspond to the beamformee 320

As shown in FIG. 13, at operation S1301 the process 1300 may include transmitting, using a transceiver of the first apparatus, an NDP to the first apparatus. In embodiments, the transceiver of the first apparatus may correspond to one of the transceiver 21_4 and the transceiver 22_4.

As further shown in FIG. 13, at operation S1302 the process 1300 may include generating a channel estimate based on the NDP. In embodiments, the channel estimate may correspond to the estimate of the channel H discussed above.

As further shown in FIG. 13, at operation S1303 the process 1300 may include receiving, using the transceiver, beamforming information from the second apparatus. In embodiments, the beamforming information may include at least one from among: a pair of angle indices which indicate a pair of angle vectors to be used by the first apparatus to beamform the data transmission, and a steering matrix index which indicates a steering matrix to be used by the first apparatus to beamform the data transmission. In embodiments, the pair of angle vectors may correspond to the angles ϕ and ψ discussed above, and the steering matrix may correspond to the steering matrix Q discussed above.

As further shown in FIG. 12, at operation S1304 the process 1200 may include transmitting, using the transceiver, a data transmission which is beamformed based on the beamforming information to the second apparatus.

In embodiments, the process 1300 may further include generating a beamforming codebook; and beamforming the data transmission using the first apparatus based on beamforming parameters obtained from the beamforming codebook.

In embodiments, the process 1300 may further include generating codebook update information based on the beamforming codebook; and transmitting the codebook update information to the second apparatus using the transceiver.

In embodiments, the generating of the beamforming codebook may include: receiving a plurality of pairs of angle vectors corresponding to a plurality of subcarriers associated with the WLAN; clustering the plurality of pairs of angle vectors based on at least one of artificial intelligence and machine learning to obtain clustered pairs of angle vectors; and storing the clustered pairs of angle vectors as the beamforming codebook.

In embodiments, the generating of the beamforming codebook may include: receiving a plurality of steering matrices corresponding to a plurality of subcarriers associated with the WLAN; clustering the plurality of steering matrices based on at least one of artificial intelligence and machine learning to obtain a plurality of candidate steering matrices; and storing the plurality of candidate steering matrices as the beamforming codebook.

Although FIGS. 12-13 show example blocks of the processes 1200 and 1300, in some implementations, the processes 1200 and 1300 may include additional blocks, fewer blocks, different blocks, or differently arranged blocks than those depicted in FIG. 12-13. Additionally, or alternatively, two or more of the blocks of the processes 1200 and 1300 may be arranged or combined in any order, or performed in parallel.

Figure 14:
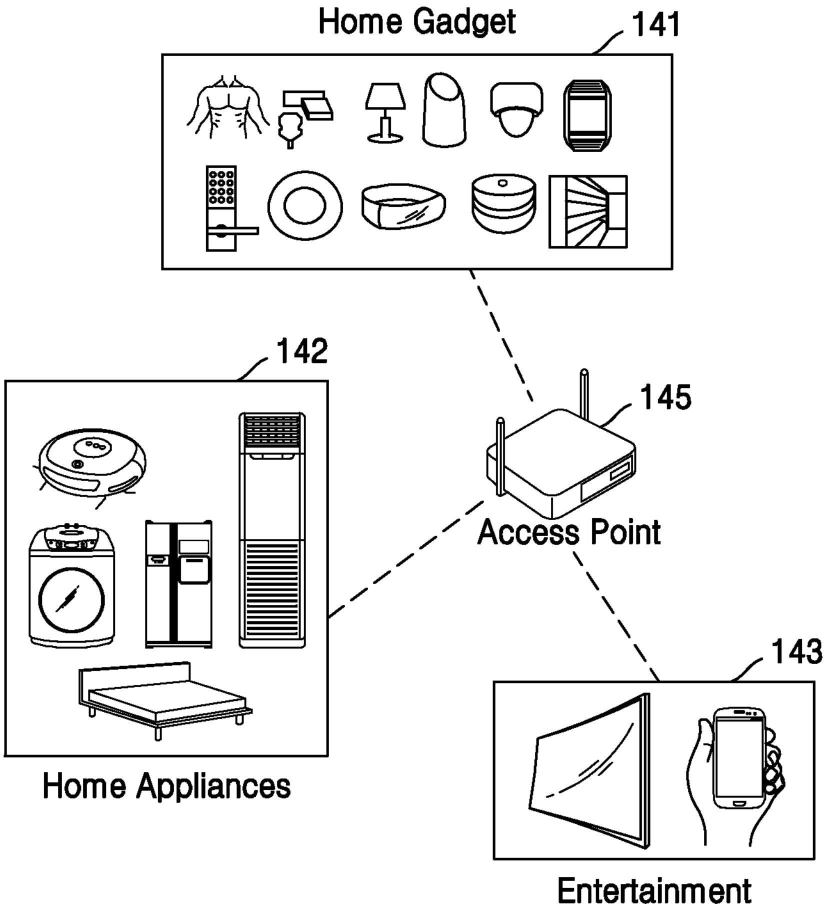
FIG. 14 is a diagram illustrating examples of an apparatus for wireless communication according to embodiments.

FIG. 14 is a diagram illustrating examples of an apparatus for wireless communication according to an example embodiment. In detail, FIG. 14 illustrates an internet of things (IoT) network system including home gadgets 141, home appliances 142, entertainment devices 143, and an access point 145 by way of example.

In some example embodiments, in the apparatus for wireless communication of FIG. 14, communication using beamforming described above with reference to FIGS. 1-13, may be performed. The access point 145 may transmit data using beamforming to the home gadgets 141, the home appliances 142, and/or the entertainment devices 143. Accordingly, the efficiency of the IoT network system may be increased.

While various example embodiments have been particularly shown and described with reference to the drawings, it will be understood that various changes in form and details may be made therein without departing from the spirit and scope of the following claims.

What is claimed is:

1. A second apparatus configured to communicate with a first apparatus in a wireless local area network (WLAN), the second apparatus comprising:
- a transceiver; and
- at least one processor configured to:
  - receive, using the transceiver, a null data packet (NDP) from the first apparatus,
  - generate a channel estimate based on the NDP,
  - decompose the channel estimate to obtain a feedback matrix,
  - based on the feedback matrix, obtain beamforming information to be used by the first apparatus to perform beamforming,
  - transmit, using the transceiver, the beamforming information to the first apparatus, and
  - receive, using the transceiver, a data transmission which is beamformed by the first apparatus based on the beamforming information,
- wherein the beamforming information comprises at least one from among:
  - a pair of angle indices which indicate a pair of angle vectors to be used by the first apparatus to beamform the data transmission, wherein the pair of angle vectors comprises a first angle vector corresponding to a first angle type, and a second angle vector corresponding to a second angle type, and
- a steering matrix index which directly indicates a steering matrix, from among a plurality of candidate steering matrices included in a beamforming codebook, to be used by the first apparatus to beamform the data transmission.

2. The second apparatus of claim 1, wherein the at least one processor is further configured to obtain the beamforming information from the beamforming codebook stored in the second apparatus.

3. The second apparatus of claim 2, wherein the at least one processor is further configured to obtain the beamforming codebook based on codebook update information received from the first apparatus using the transceiver.

4. The second apparatus of claim 2, wherein the at least one processor is further configured to compute the pair of angle vectors based on the feedback matrix.

5. The second apparatus of claim 4,
- wherein the pair of angle indices comprises a first angle index, which indicates the first angle vector, and a second angle index which indicates the second angle vector, and
- wherein the at least one processor is further configured to obtain the first angle index based on a comparison between the first angle vector and the beamforming codebook, and to obtain the second angle index based on a comparison between the second angle vector and the beamforming codebook.

6. The second apparatus of claim 2, wherein the at least one processor is further configured to obtain the steering matrix based on the feedback matrix.

7. The second apparatus of claim 6, wherein the at least one processor is further configured to obtain the steering matrix index based on a comparison between the steering matrix and the beamforming codebook.

8. A first apparatus configured to communicate with a second apparatus in a wireless local area network (WLAN), the first apparatus comprising:
- a transceiver; and
- at least one processor configured to:
  - transmit, using the transceiver, a null data packet (NDP) to the second apparatus,
  - receive, using the transceiver, beamforming information from the second apparatus, and
  - transmit, using the transceiver, a data transmission which is beamformed based on the beamforming information to the second apparatus,
- wherein the beamforming information comprises at least one from among:
  - a pair of angle indices which indicate a pair of angle vectors used to beamform the data transmission, wherein the pair of angle vectors comprises a first angle vector corresponding to a first angle type, and a second angle vector corresponding to a second angle type, and a steering matrix index which directly indicates a steering matrix, from among a plurality of candidate steering matrices included in a beamforming codebook, used to beamform the data transmission.

9. The first apparatus of claim 8, wherein the at least one processor is further configured to:

beamform the data transmission based on beamforming parameters obtained from the beamforming codebook generated by the first apparatus.

10. The first apparatus of claim 9, wherein the at least one processor is further configured to:

generate codebook update information based on the beamforming codebook, and transmit the codebook update information to the second apparatus using the transceiver.

11. The first apparatus of claim 9, wherein to generate the beamforming codebook, the at least one processor is further configured to:

receive a plurality of pairs of angle vectors corresponding to a plurality of subcarriers associated with the WLAN, cluster the plurality of pairs of angle vectors based on at least one of artificial intelligence and machine learning to obtain clustered pairs of angle vectors, and store the clustered pairs of angle vectors as the beamforming codebook.

12. The first apparatus of claim 9, wherein to generate the beamforming codebook, the at least one processor is further configured to:

receive a plurality of steering matrices corresponding to a plurality of subcarriers associated with the WLAN, cluster the plurality of steering matrices based on at least one of artificial intelligence and machine learning to obtain the plurality of candidate steering matrices, and store the plurality of candidate steering matrices as the beamforming codebook.

13. A method of controlling a second apparatus configured to communicate with a first apparatus in a wireless local area network (WLAN), the method comprising:

receiving, using a transceiver of the second apparatus, a null data packet (NDP) from the first apparatus;

generating a channel estimate based on the NDP;

decomposing the channel estimate to obtain a feedback matrix;

based on the feedback matrix, obtaining beamforming information to be used by the first apparatus to perform beamforming;

transmitting, using the transceiver, the beamforming information to the first apparatus; and receiving, using the transceiver, a data transmission which is beamformed by the first apparatus based on the beamforming information, wherein the beamforming information comprises at least one from among:

a pair of angle indices which indicate a pair of angle vectors to be used by the first apparatus to beamform the data transmission, wherein the pair of angle vectors comprises a first angle vector corresponding to a first angle type, and a second angle vector corresponding to a second angle type, and a steering matrix index which directly indicates a steering matrix, from among a plurality of candidate steering matrices included in a beamforming codebook, to be used by the first apparatus to beamform the data transmission.

14. The method of claim 13, wherein the beamforming information is obtained from the beamforming codebook stored in the second apparatus.

15. The method of claim 14, wherein the beamforming codebook is obtained based on codebook update information received from the first apparatus using the transceiver.

16. The method of claim 14, further comprising computing the pair of angle vectors based on the feedback matrix.

17. The method of claim 16, wherein the pair of angle indices comprises a first angle index which indicates the first angle vector, and a second angle index which indicates the second angle vector, and wherein the obtaining of the beamforming information comprises obtaining the first angle index based on a comparison between the first angle vector and the beamforming codebook, and obtaining the second angle index based on a comparison between the second angle vector and the beamforming codebook.

18. The method of claim 14, further comprising obtaining the steering matrix based on the feedback matrix.

19. The method of claim 18, wherein the obtaining of the beamforming information comprises obtaining the steering matrix index based on a comparison between the steering matrix and the beamforming codebook.

20. A method of controlling a first apparatus configured to communicate with a second apparatus in a wireless local area network (WLAN), the method comprising:

transmitting, using a transceiver of the first apparatus, a null data packet (NDP) to the second apparatus;

receiving, using the transceiver, beamforming information from the second apparatus; and transmitting, using the transceiver, a data transmission which is beamformed based on the beamforming information to the second apparatus, wherein the beamforming information comprises at least one from among a pair of angle indices which indicate a pair of angle vectors used to beamform the data transmission, and a steering matrix index which directly indicates a steering matrix, from among a plurality of candidate steering matrices included in a beamforming codebook, used to beamform the data transmission, wherein the pair of angle vectors comprises a first angle vector corresponding to a first angle type, and a second angle vector corresponding to a second angle type.

21. The method of claim 20, further comprising:

generating the beamforming codebook; and beamforming the data transmission using the first apparatus based on beamforming parameters obtained from the beamforming codebook.

22. The method of claim 21, further comprising:

generating codebook update information based on the beamforming codebook; and transmitting the codebook update information to the second apparatus using the transceiver.

23. The method of claim 21, wherein the generating of the beamforming codebook comprises:

receiving a plurality of pairs of angle vectors corresponding to a plurality of subcarriers associated with the WLAN;

clustering the plurality of pairs of angle vectors based on at least one of artificial intelligence and machine learning to obtain clustered pairs of angle vectors; and storing the clustered pairs of angle vectors as the beamforming codebook.

24. The method of claim 21, wherein the generating of the beamforming codebook comprises:

receiving a plurality of steering matrices corresponding to a plurality of subcarriers associated with the WLAN;

clustering the plurality of steering matrices based on at least one of artificial intelligence and machine learning to obtain the plurality of candidate steering matrices; and storing the plurality of candidate steering matrices as the beamforming codebook.

* * * * *